United States Patent
Nanjo et al.

(10) Patent No.: US 7,417,778 B2
(45) Date of Patent: Aug. 26, 2008

(54) LIGHT DEFLECTOR, LIGHT DEFLECTION ARRAY, IMAGE FORMING APPARATUS, AND IMAGE PROJECTION DISPLAY APPARATUS

(75) Inventors: Takeshi Nanjo, Sendai (JP); Seiichi Katoh, Sendai (JP); Koichi Ohtaka, Shibata-gun (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

(21) Appl. No.: 11/098,700

(22) Filed: Apr. 5, 2005

(65) Prior Publication Data
US 2005/0248862 A1    Nov. 10, 2005

(30) Foreign Application Priority Data
Apr. 5, 2004    (JP)    ............... 2004-110851

(51) Int. Cl.
G02B 26/08    (2006.01)
G02B 26/00    (2006.01)
(52) U.S. Cl. .............. 359/223; 359/196; 359/290; 359/295; 359/298
(58) Field of Classification Search .......... 359/290, 359/291, 295, 298, 196, 223–226, 872, 881
See application file for complete search history.

(56) References Cited

U.S. PATENT DOCUMENTS

| 2002/0109899 | A1 | 8/2002 | Ohtaka et al. |
| 2003/0142383 | A1 | 7/2003 | Nanjyo et al. |
| 2004/0012667 | A1 | 1/2004 | Ohtaka et al. |
| 2004/0263936 | A1 | 12/2004 | Nanjyo et al. |
| 2005/0248862 | A1 | 11/2005 | Nanjo et al. |

FOREIGN PATENT DOCUMENTS

| JP | 09-252401 | 9/1997 |
| JP | 11-032209 | 2/1999 |
| JP | 11-203467 | 7/1999 |

OTHER PUBLICATIONS

Larry J. Hornbeck, "Deformable-Mirror Spatial Light Modulators," Texas Instruments Incorporated, Central Research Laboratories, Spatial Light Modulators and Applications III, SPIE Critical Reviews Series, vol. 1150, pp. 86-102.
Peter F. Van Kessel, et al., "A MEMS-Based Projection Display," Proceedings of the IEEE, vol. 86, No. 8, Aug. 1998, pp. 1687-1704.
O. Solgaard, et al., "Deformable Grating Optical Modulator," Optical Society of America, Optics Letters, vol. 17, No. 9, May 1, 1992, pp. 688-690.
U.S. Appl. No. 11/098,700, filed Apr. 5, 2005, Nanjo et al.
U.S. Appl. No. 11/406,372, filed Apr. 19, 2006, Nanjyo et al.
U.S. Appl. No. 11/776,305, filed Jul. 11, 2007, Nanjyo et al.
U.S. Appl. No. 11/681,021, filed Mar. 1, 2007, Katoh et al.

*Primary Examiner*—Ricky Mack
*Assistant Examiner*—Jack Dinh
(74) *Attorney, Agent, or Firm*—Oblon, Spivak, McClelland, Maier & Neustadt, P.C.

(57) ABSTRACT

A light deflector can be driven by a low voltage by reducing contact area with a plate shape member and other members. The light deflector can be driven by a low voltage by reducing a contact area with a plate shape member and other members. More particularly, a frictional force and fixing strength are reduced at a contact area with a control member deployed around a plate shape member and the plate shape member. The fixing strength is reduced at a contact area with a fulcrum member and the plate shape member. Also, the fixing strength is reduced at a contact area with a substrate (or an insulation layer on a substrate) and the plate shape member.

6 Claims, 38 Drawing Sheets

B-B' CROSS SECTION

FIG. 2A
BACKGROUND ART
A-A' CROSS SECTION
ELECTROSTATIC ATTRACTION
C-C' CROSS SECTION
FIG. 2B
BACKGROUND ART
A-A' CROSS SECTION
C-C' CROSS SECTION
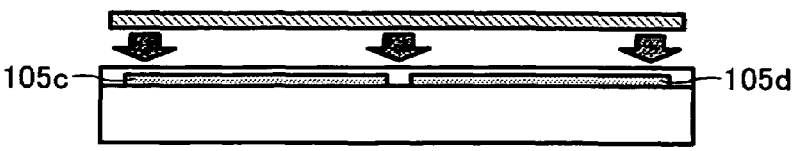

B-B' CROSS SECTION

FIG. 5A
BACKGROUND ART
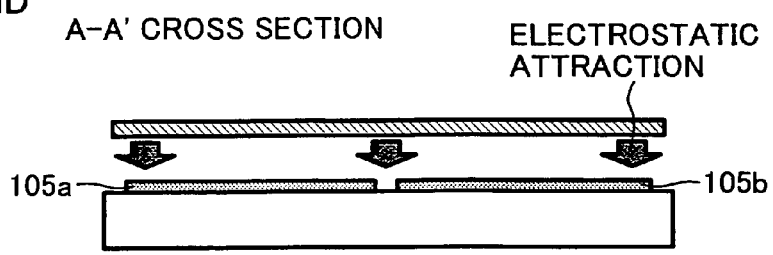
FIG. 5B
BACKGROUND ART
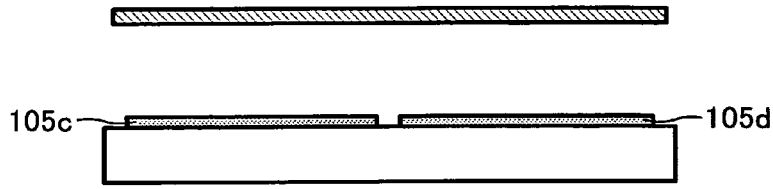
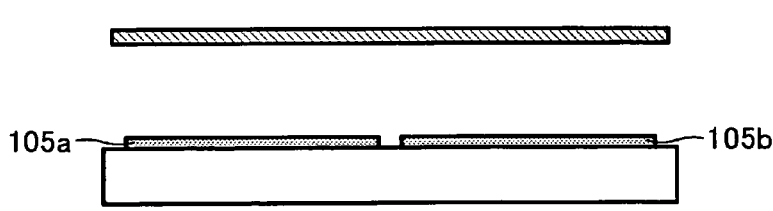
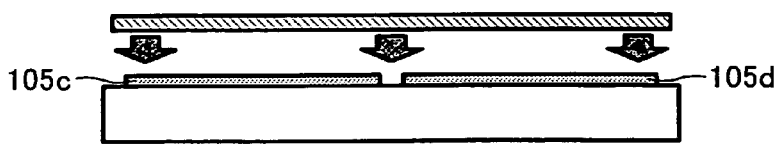

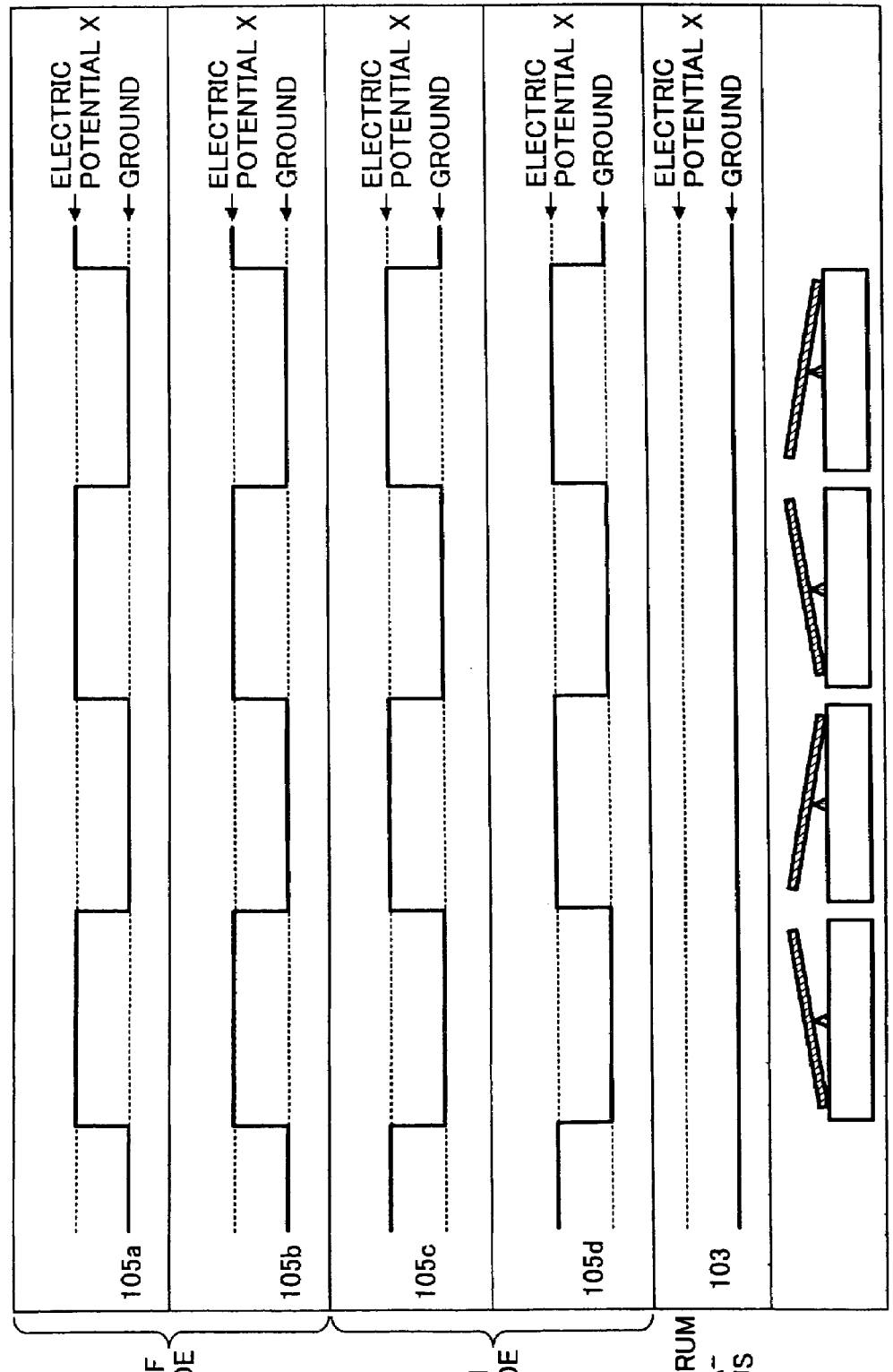

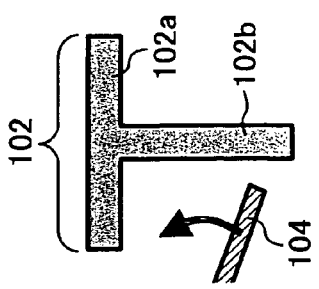 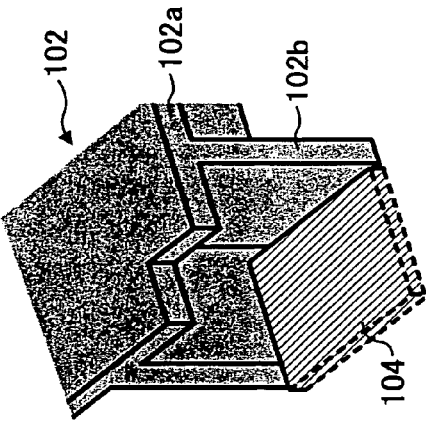 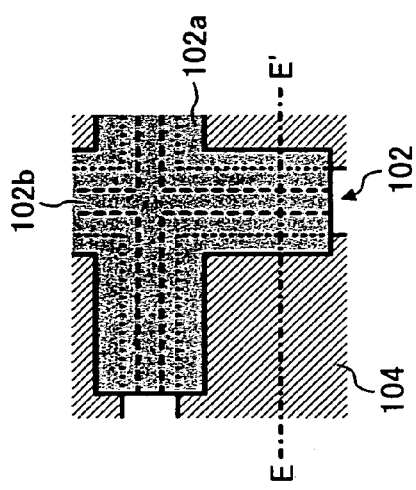
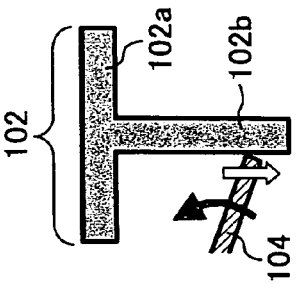 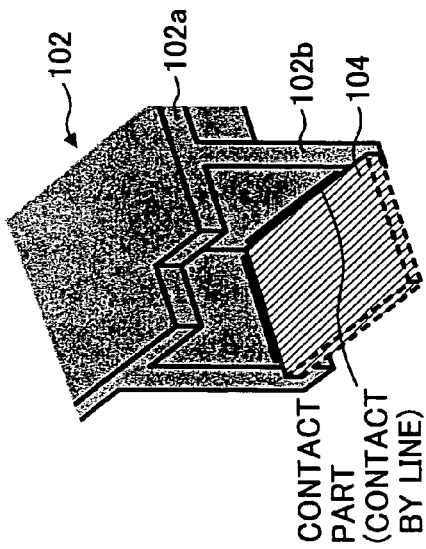 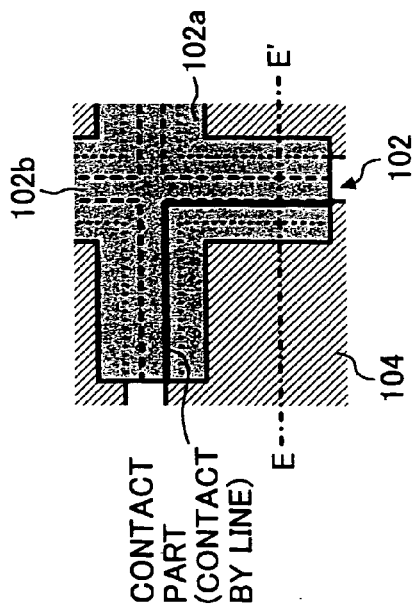

B-B' CROSS SECTION

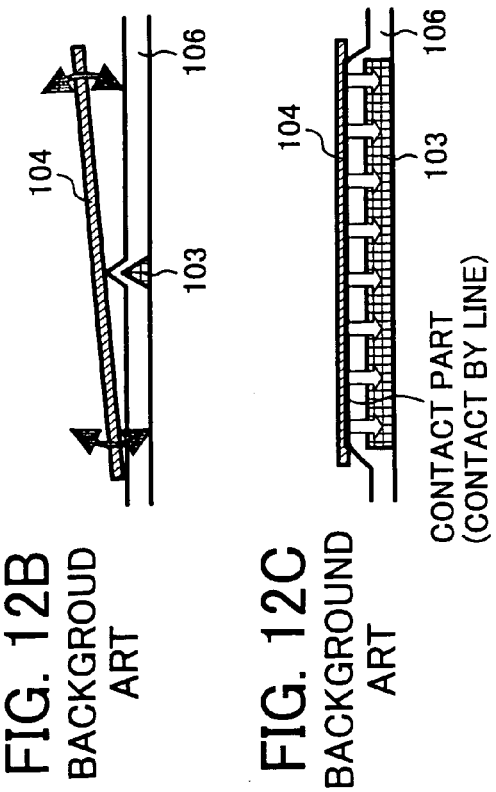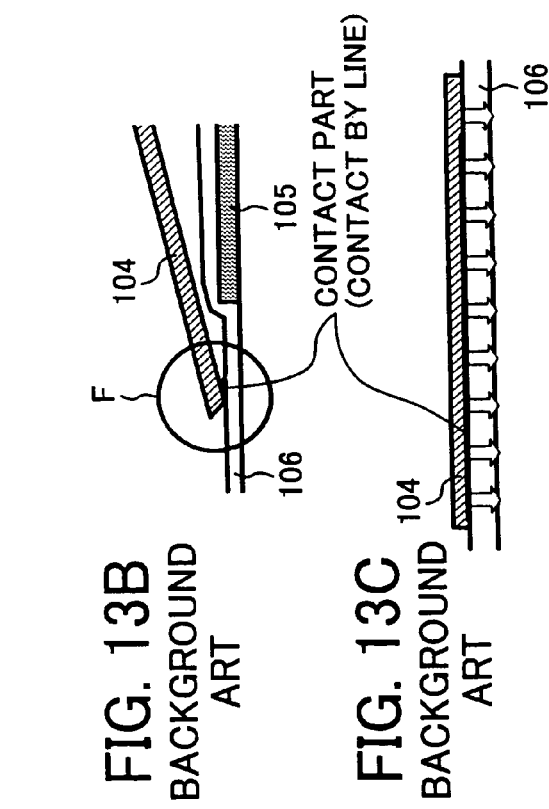
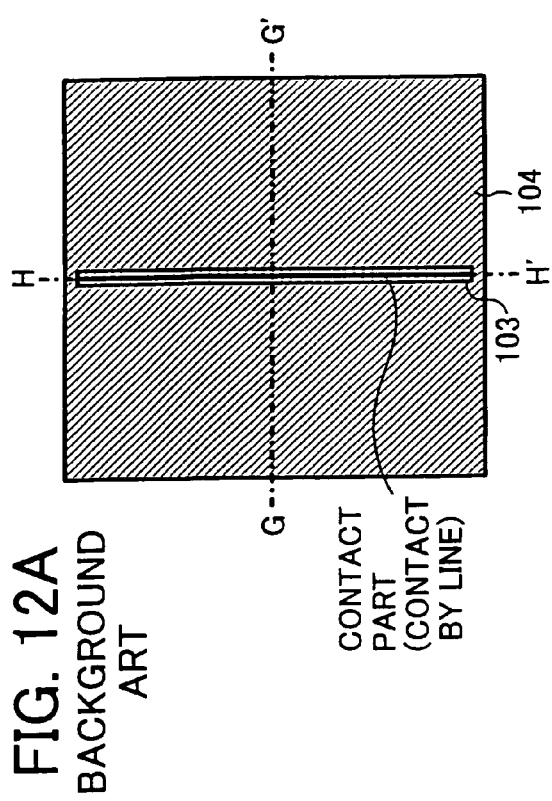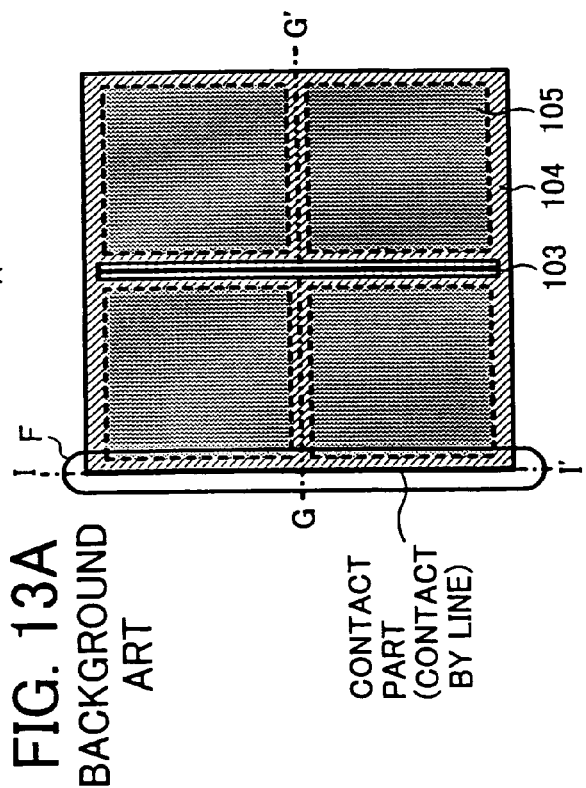

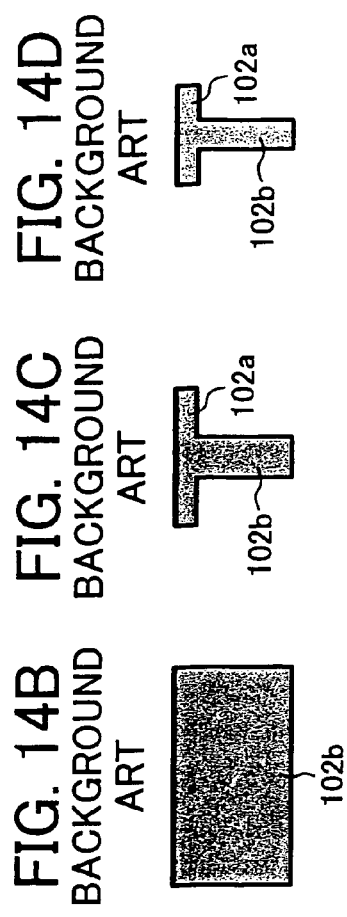
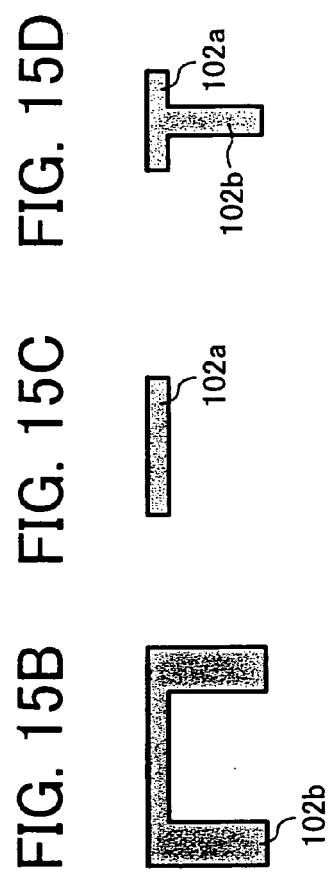
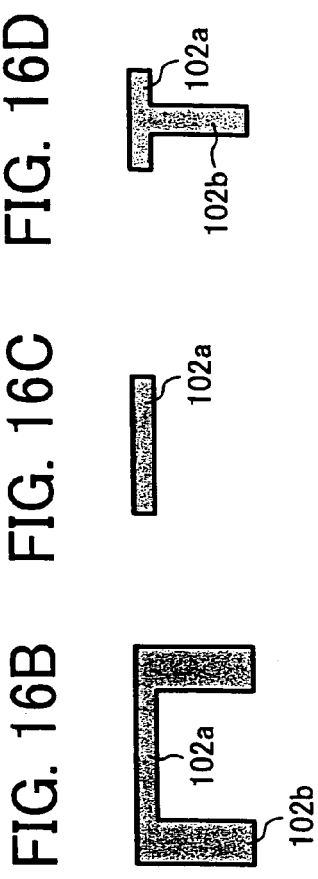
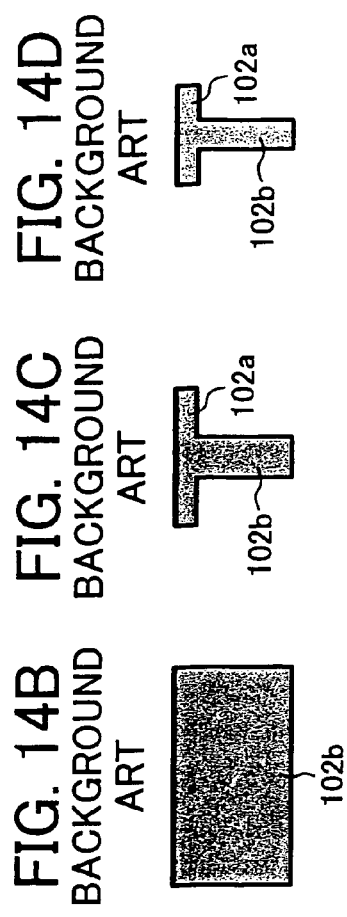
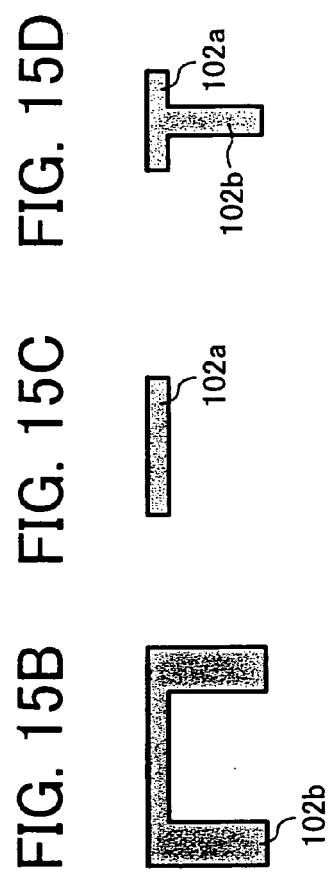
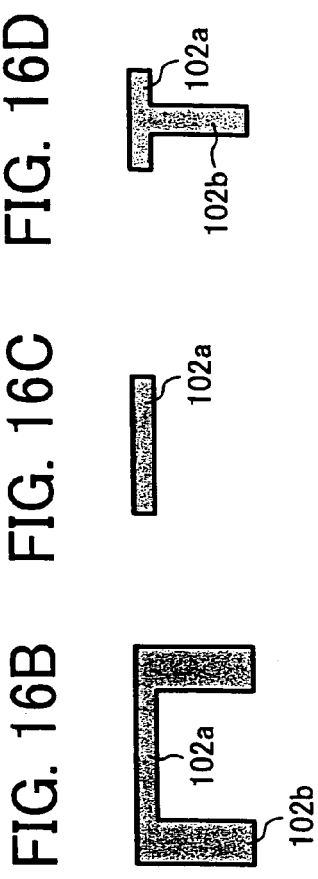
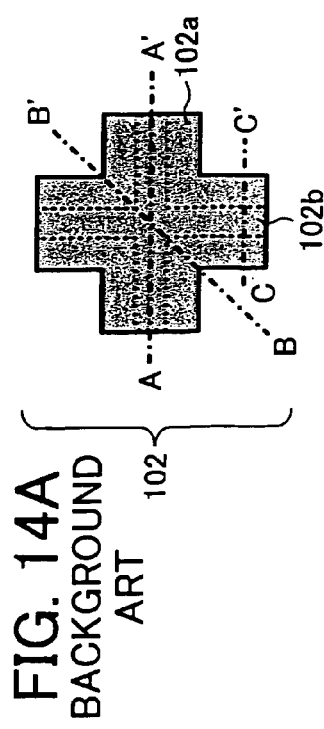

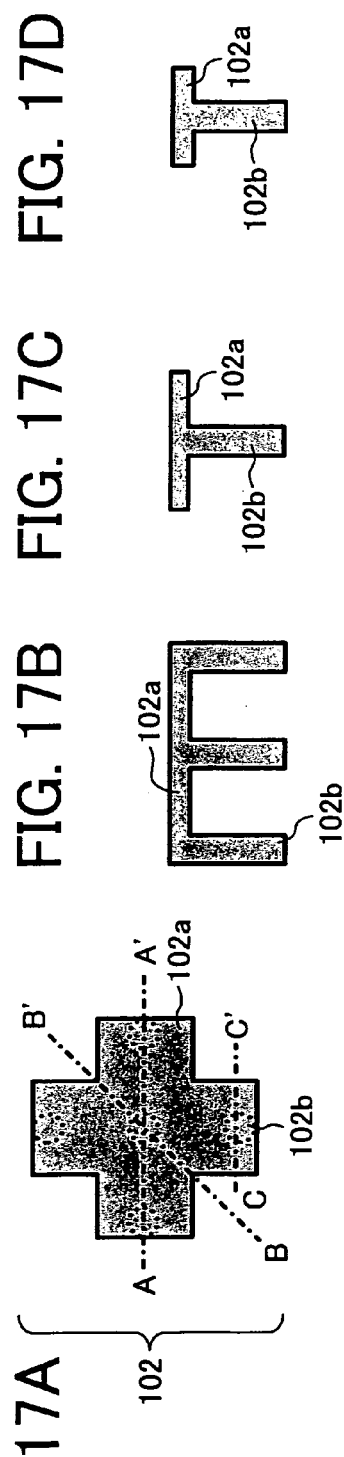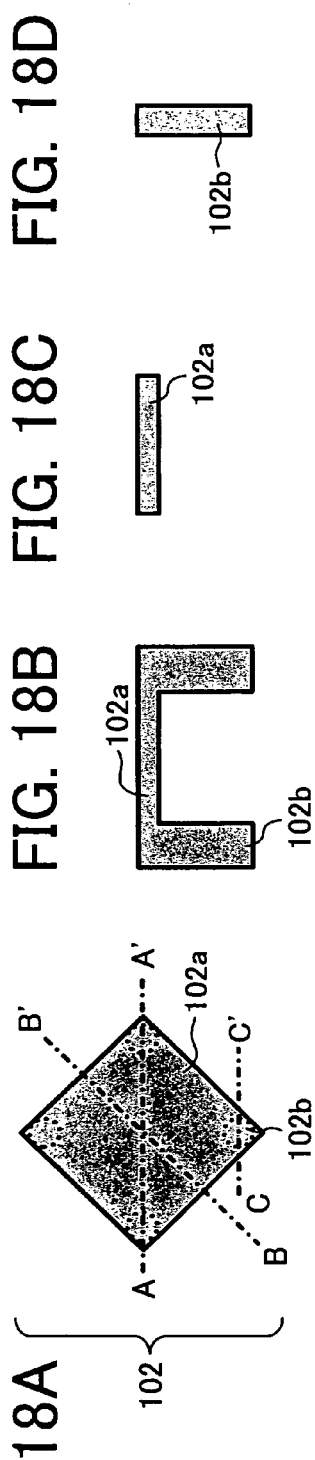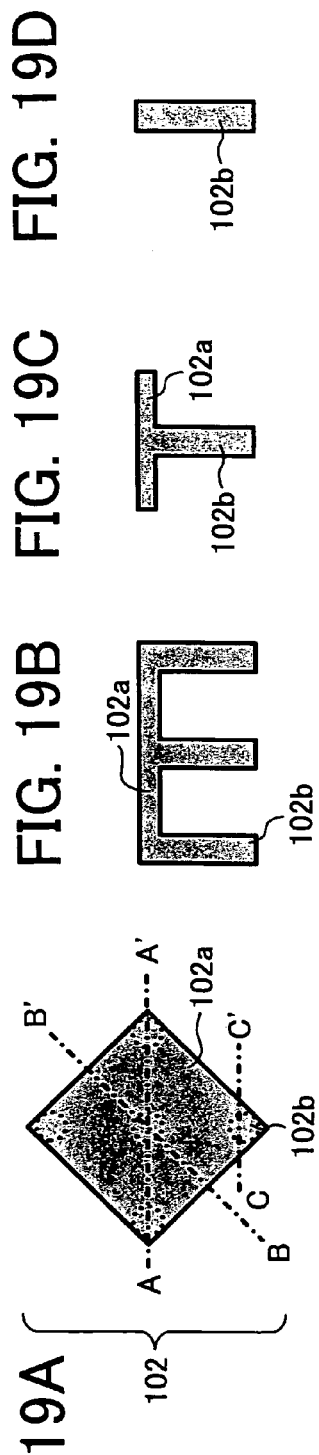

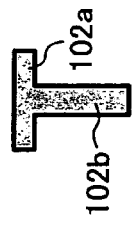
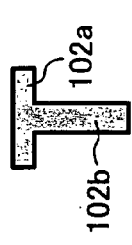
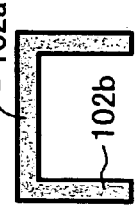
FIG. 20C
FIG. 21C
FIG. 22D
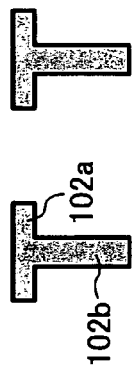
FIG. 20B
FIG. 21B
FIG. 22C
FIG. 22B
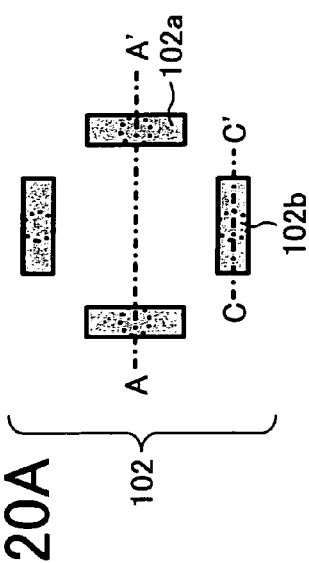
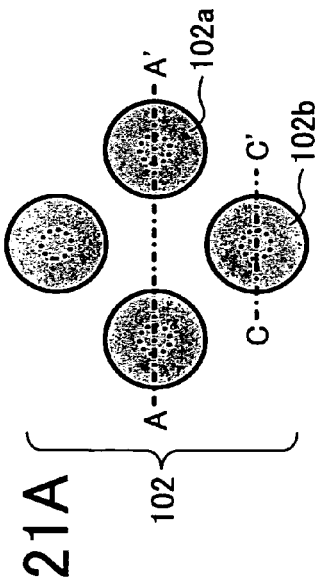
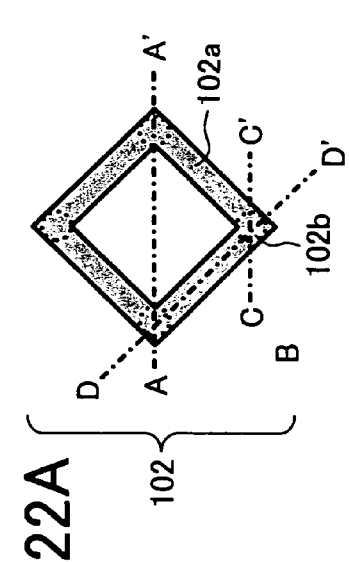
FIG. 20A
FIG. 21A
FIG. 22A

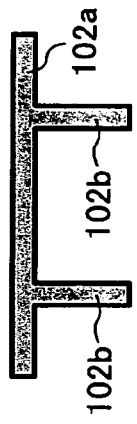 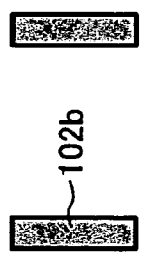 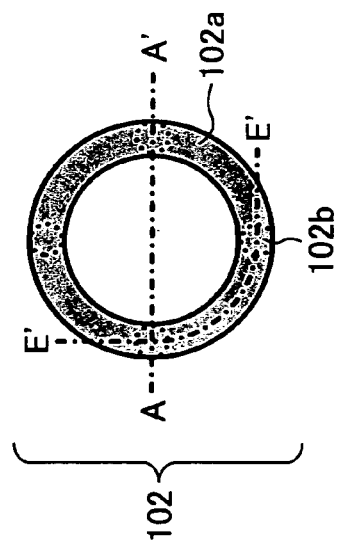
FIG. 23A  FIG. 23B  FIG. 23C
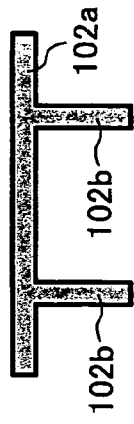  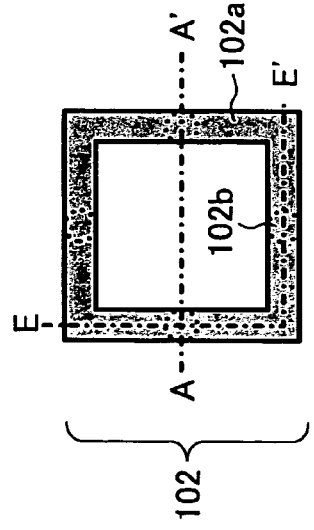
FIG. 24A  FIG. 24B  FIG. 24C

A-A' CROSS SECTION

B-B' CROSS SECTION

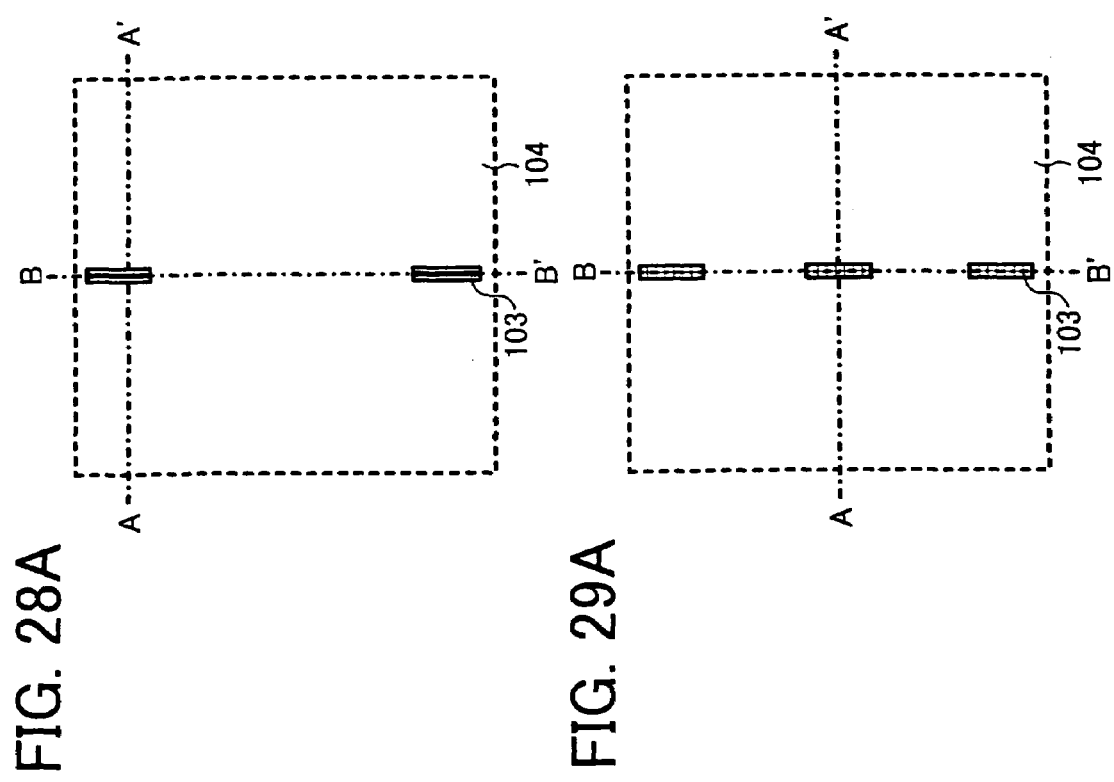

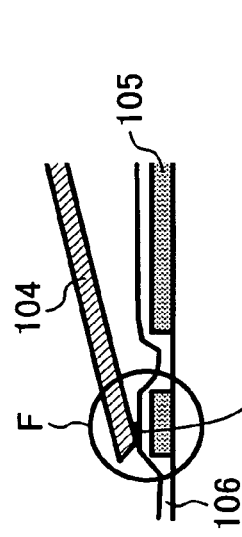
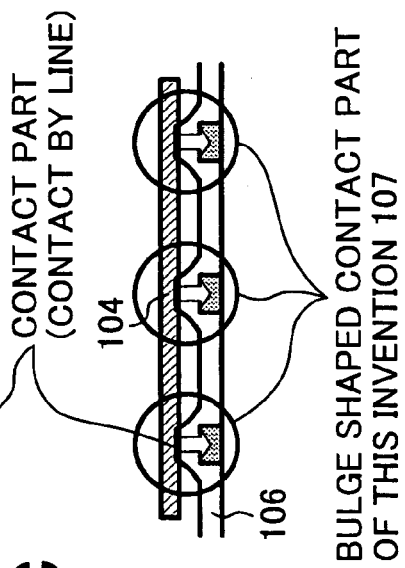
FIG. 33B
FIG. 33C
BULGE SHAPED CONTACT PART OF THIS INVENTION 107
CONTACT PART (CONTACT BY LINE)
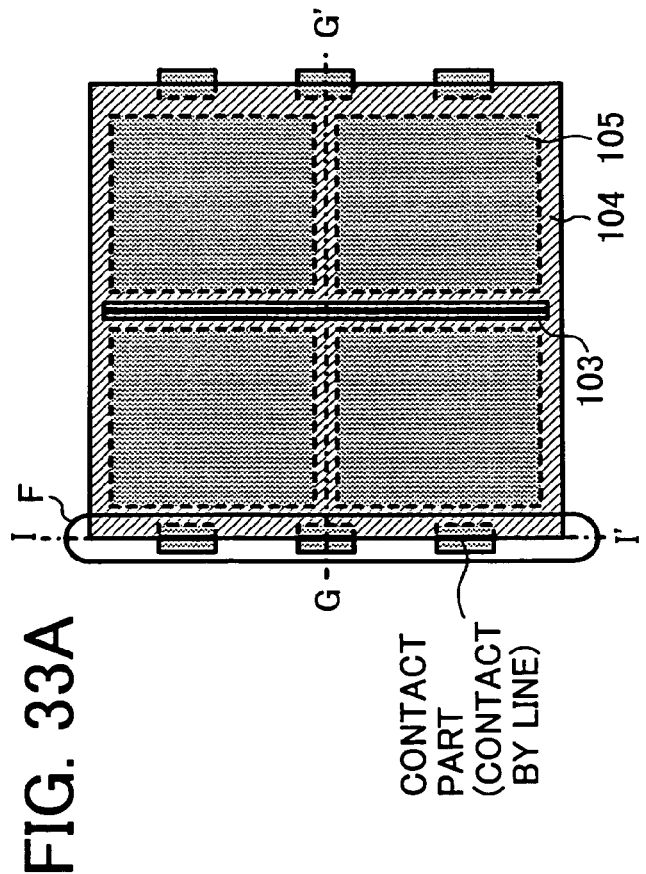
FIG. 33A
CONTACT PART (CONTACT BY LINE)

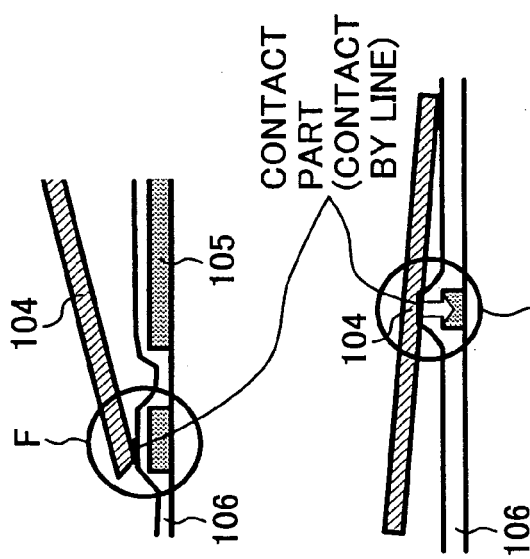
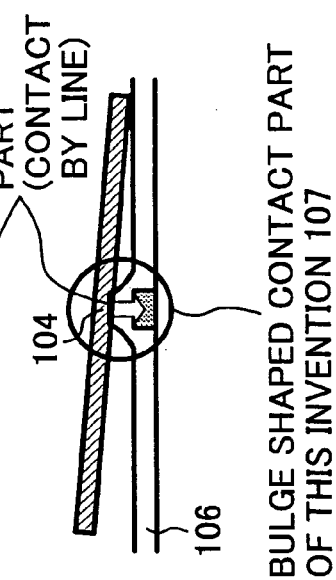
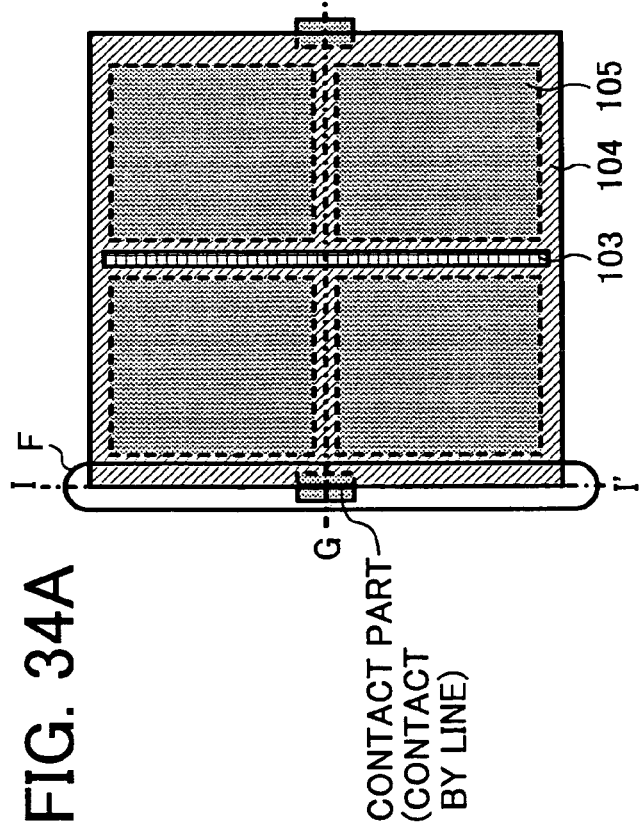
FIG. 34A
FIG. 34B
FIG. 34C

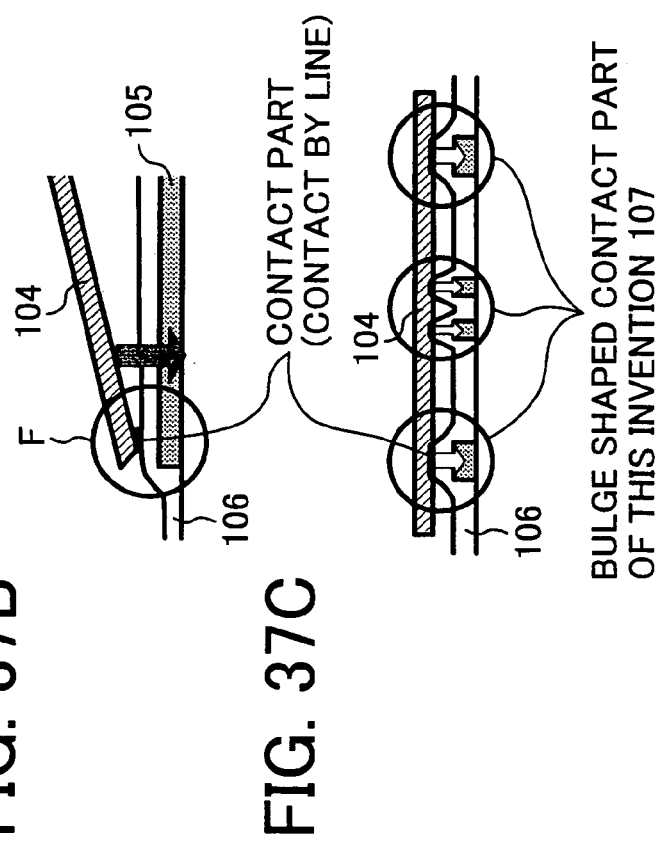
FIG. 37B
FIG. 37C
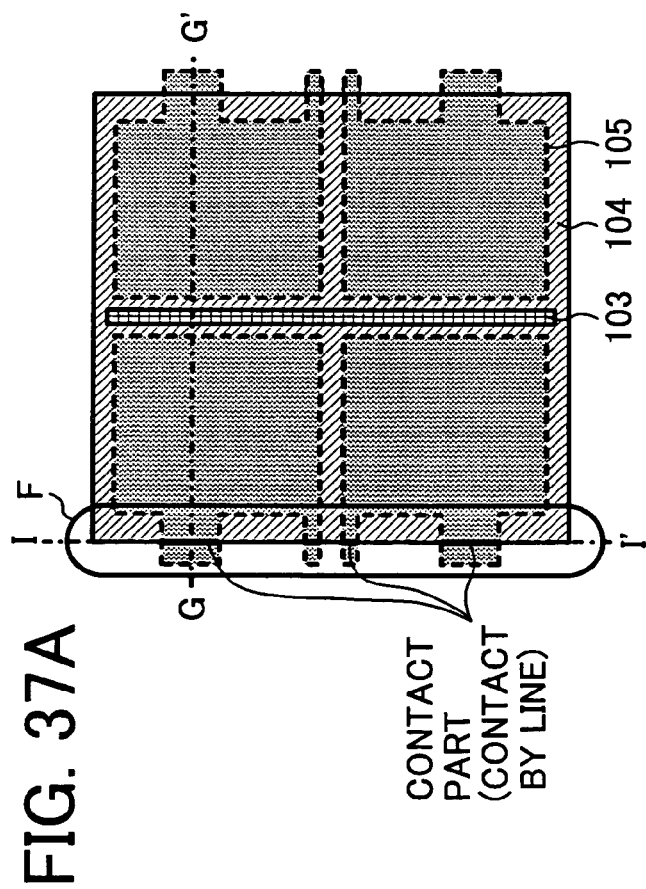
FIG. 37A

FIG. 39
(d1)
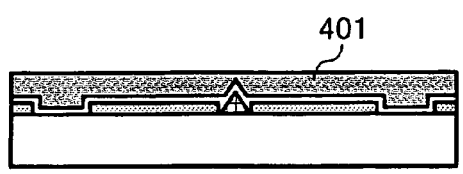
(d2)
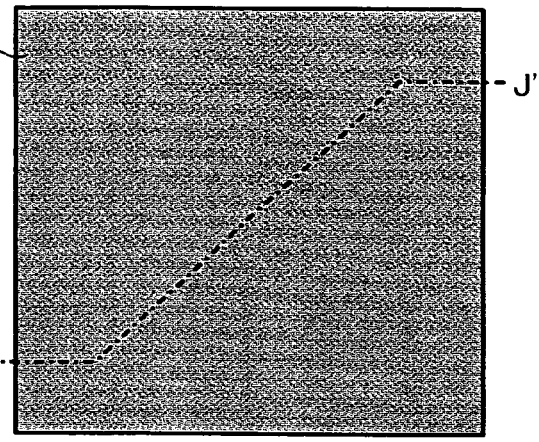
(e1)
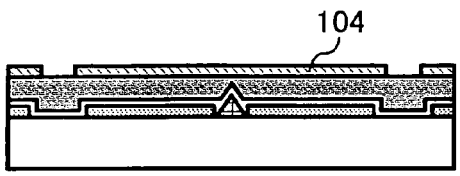
(e2)
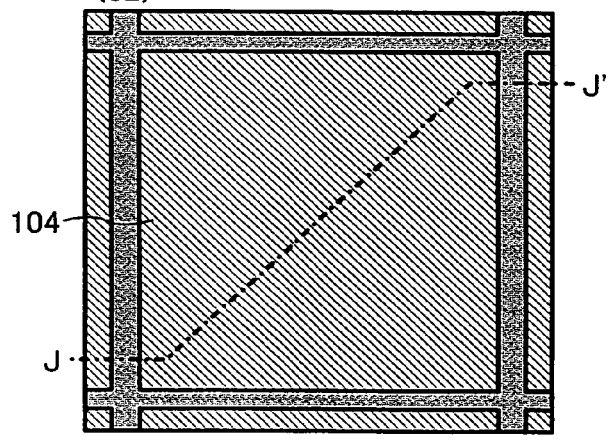
(f1)
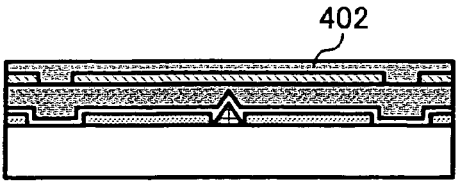
(f2)
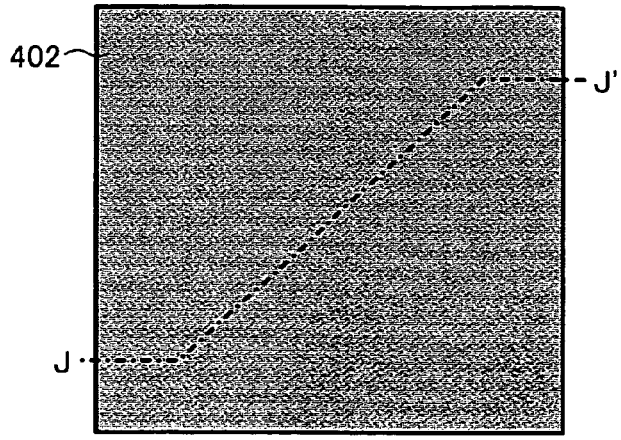

FIG. 40
(g1)
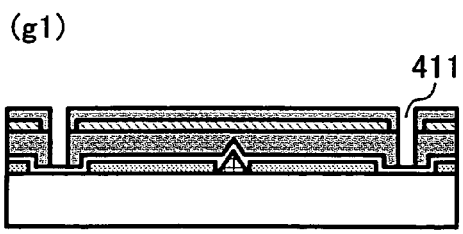
(g2)
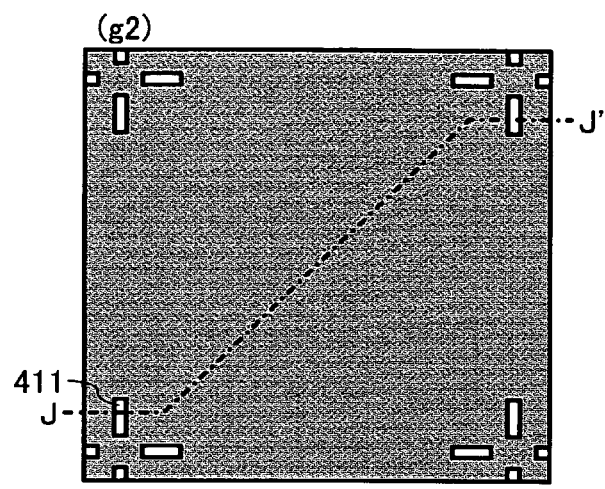
(h1)
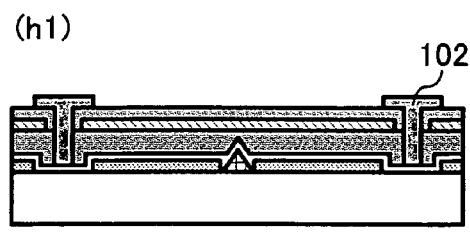
(h2)
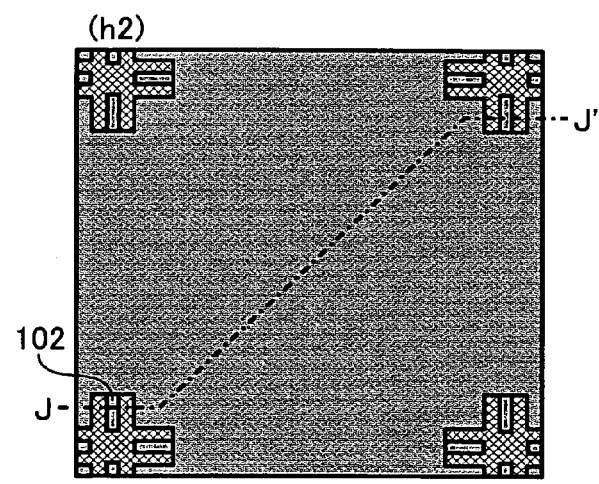
(i1)
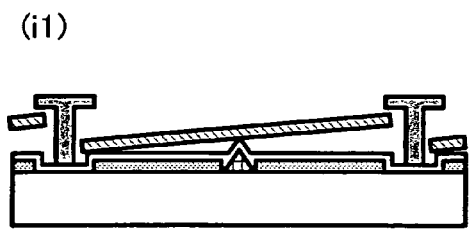
(i2)
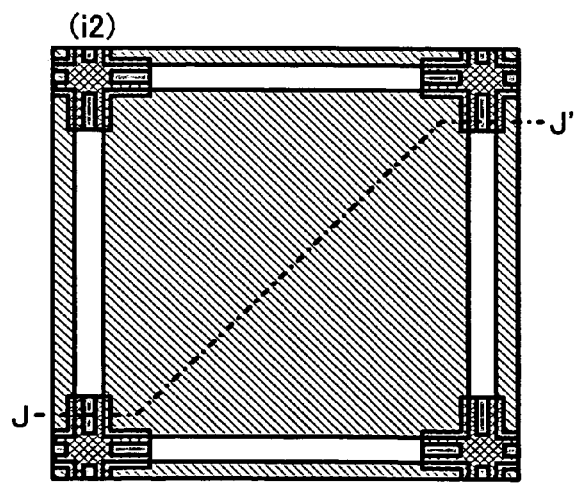

FIG. 41
(a1)
(a2)
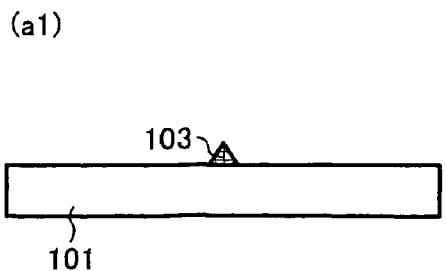
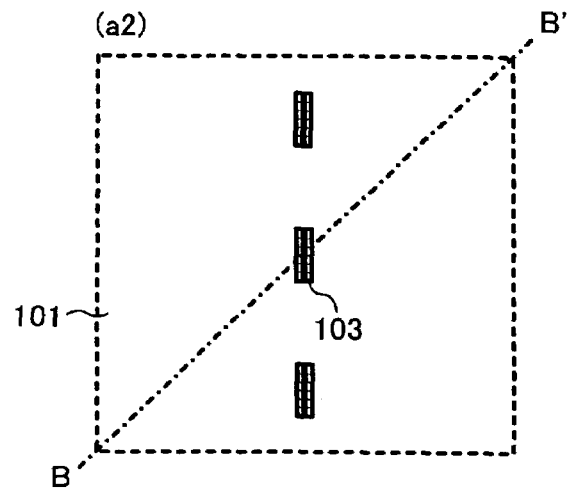
(b1)
(b2)
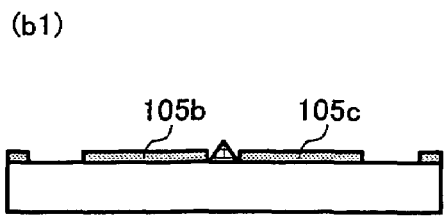
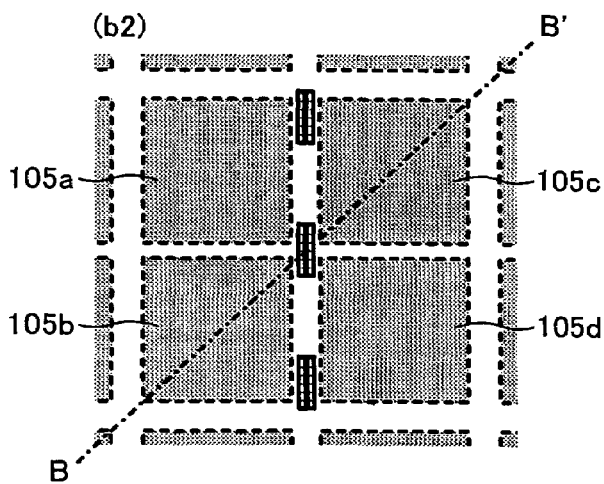
(c1)
(c2)
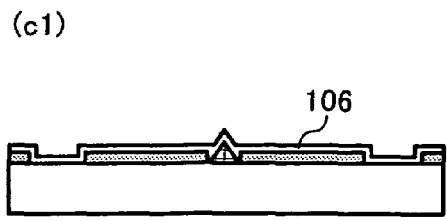
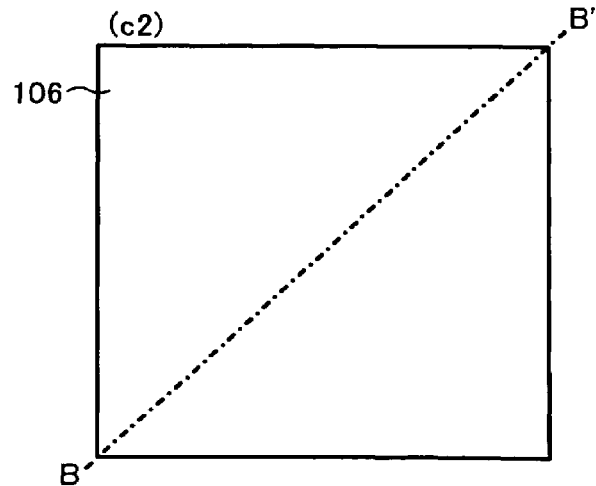

FIG. 42
(d1)
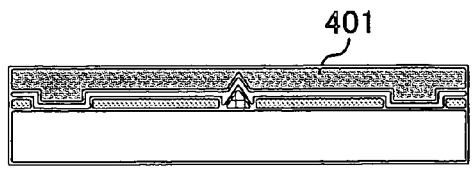
(d2)
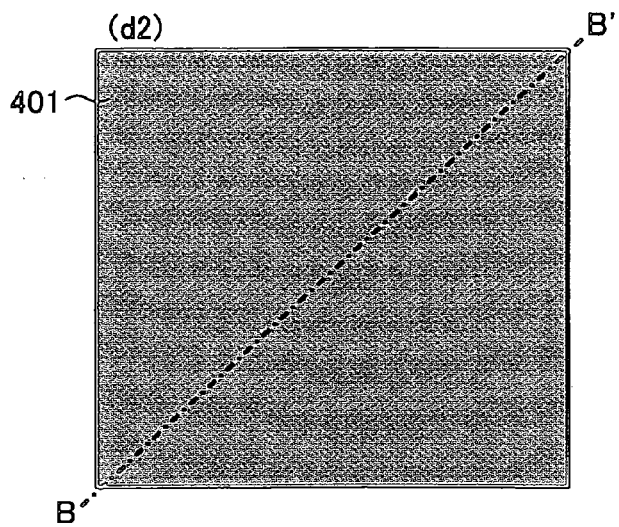
(e1)
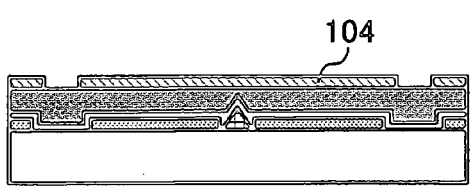
(e2)
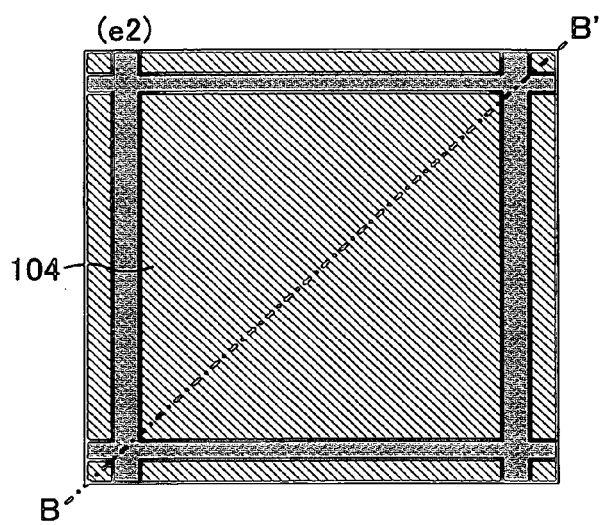
(f1)
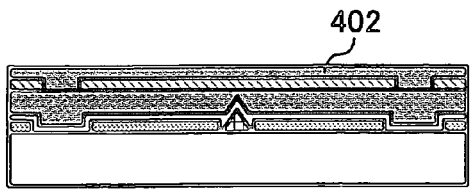
(f2)
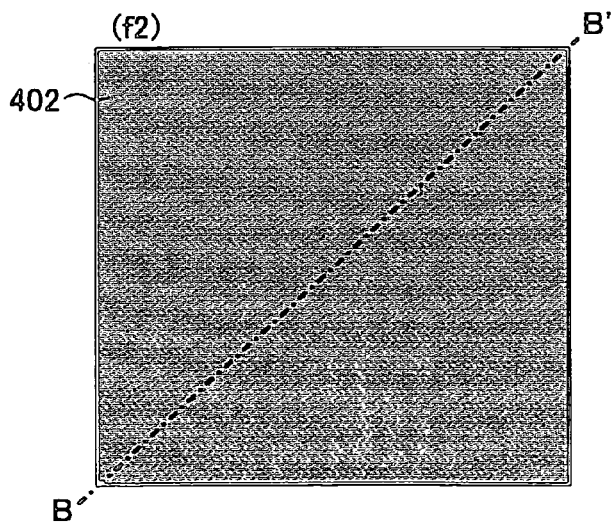

FIG. 43
(g1)
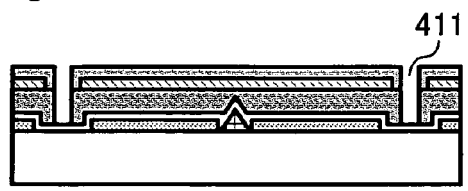
(g2)
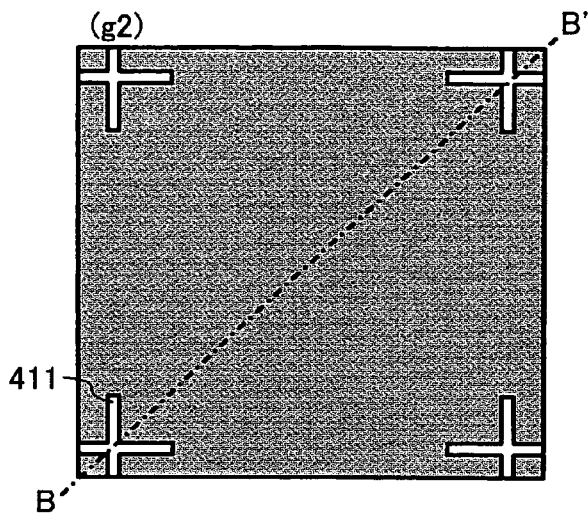
(h1)
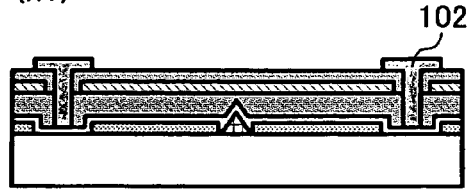
(h2)
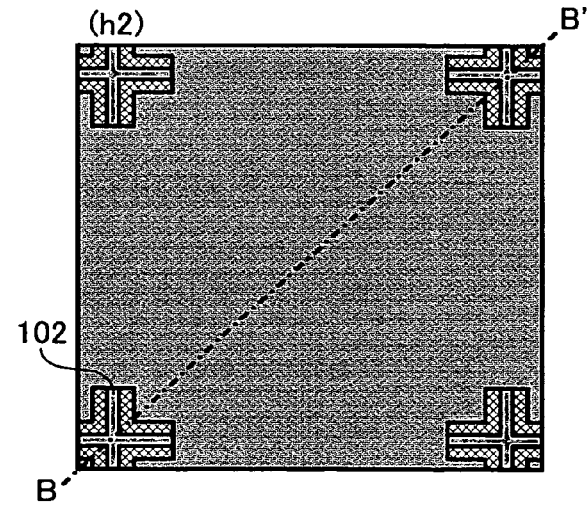
(i1)
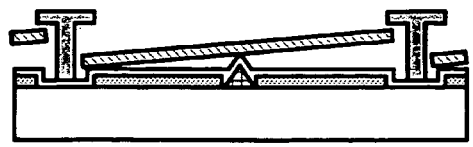
(i2)
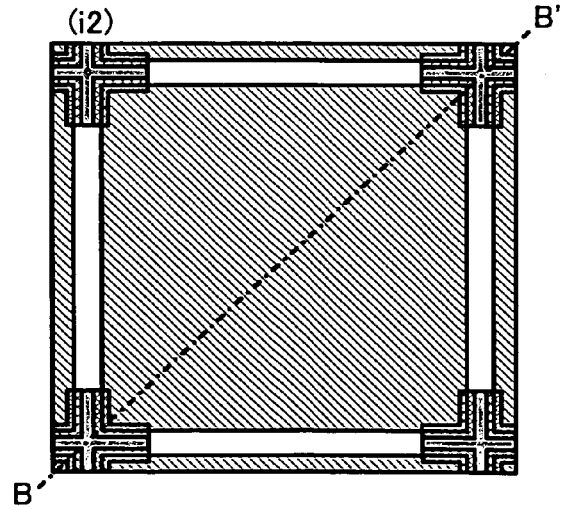

FIG. 44
(a1)
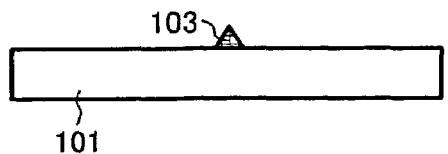
(a2)
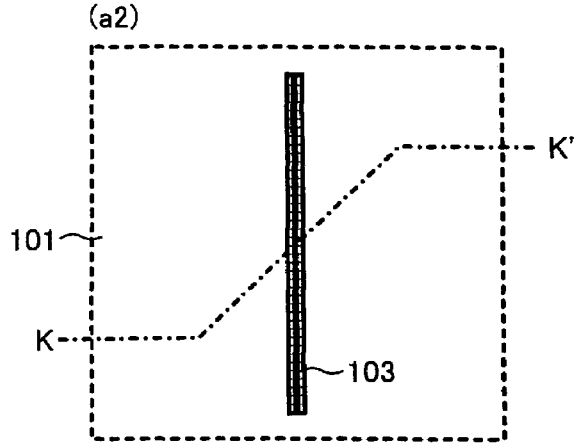
(b1)
BULGE SHAPED CONTACT PART OF THIS INVENTION 107
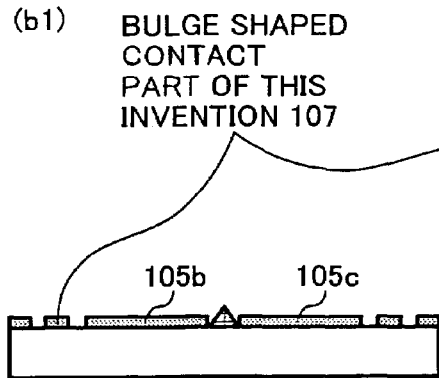
(b2)
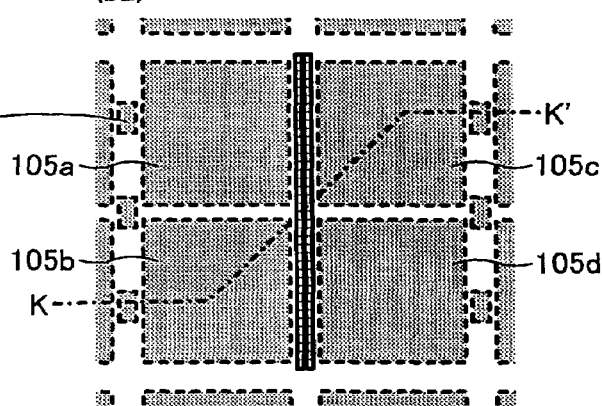
(c1)
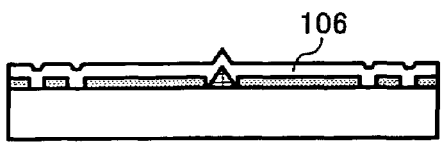
(c2)
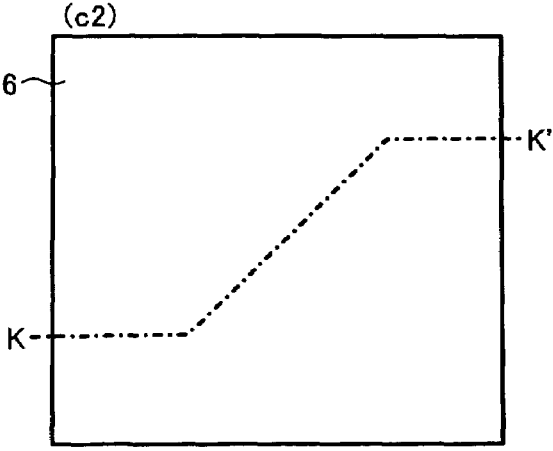

FIG. 45
(d1)
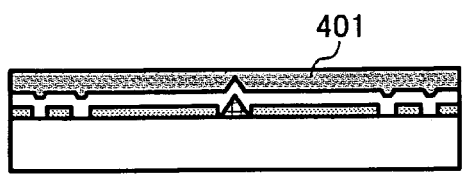
(d2)
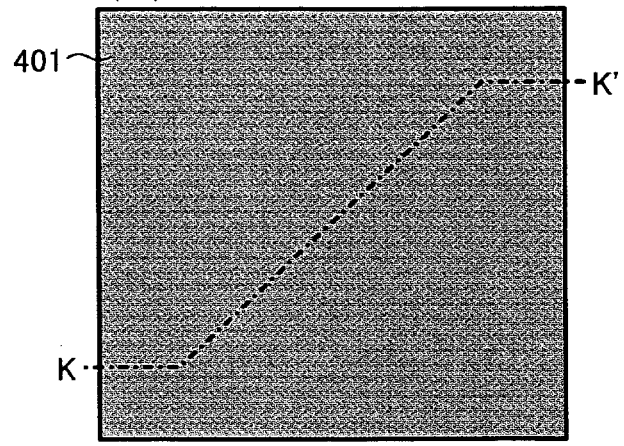
(e1)
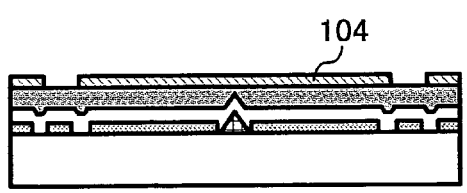
(e2)
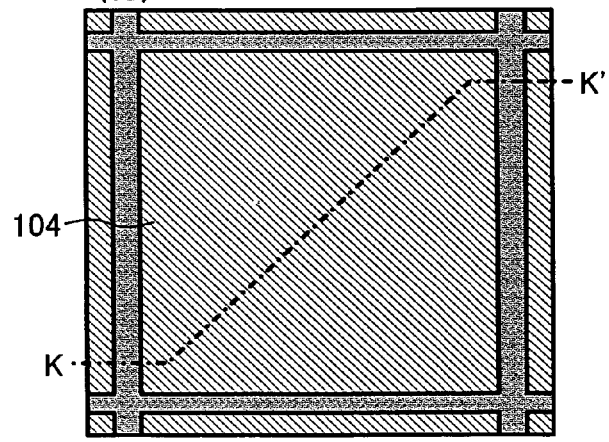
(f1)
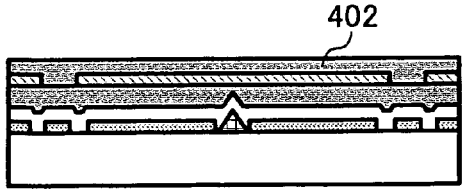
(f2)
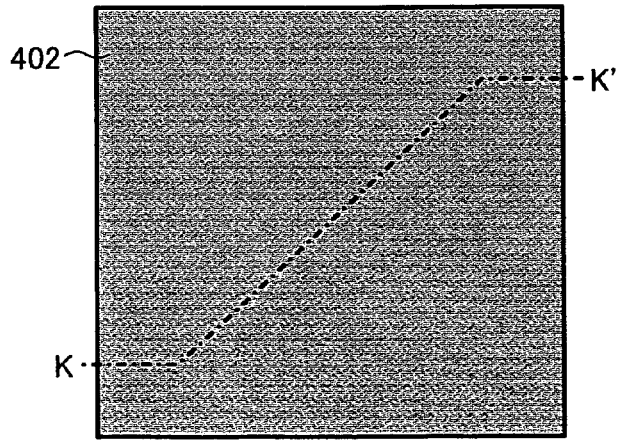

FIG. 46
(g1)
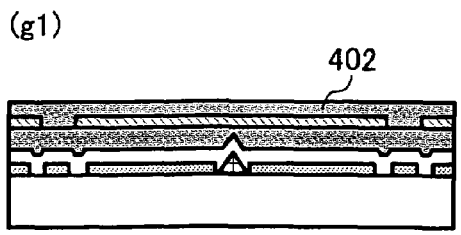
(g2)
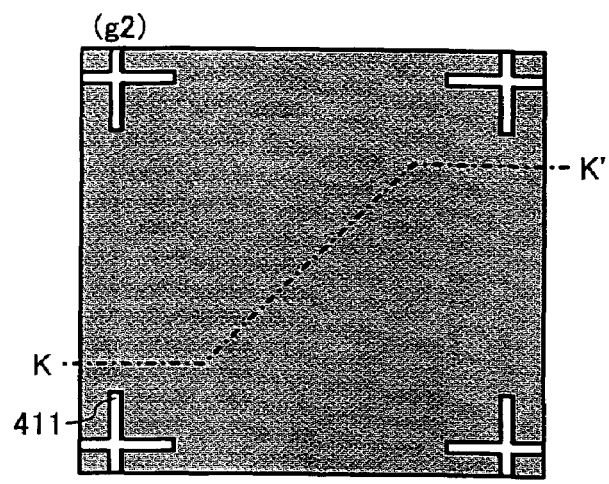
(h1)
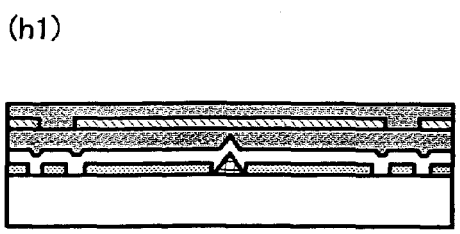
(h2)
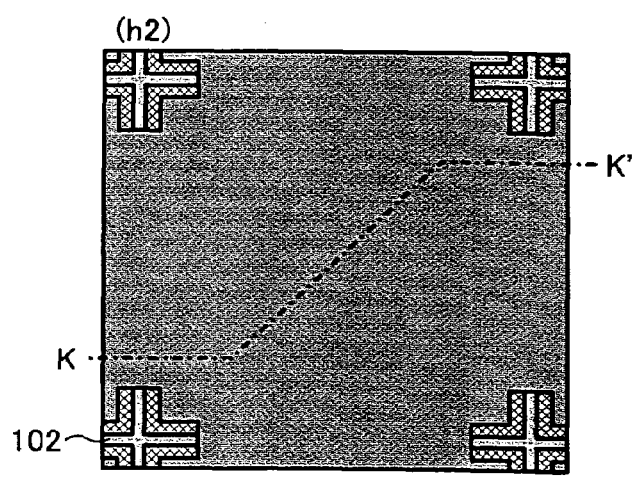
(i1)
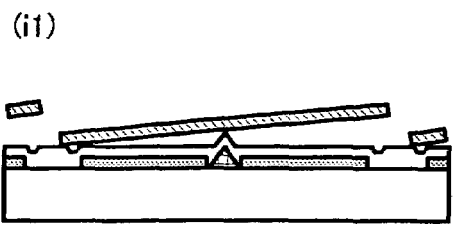
(i2)
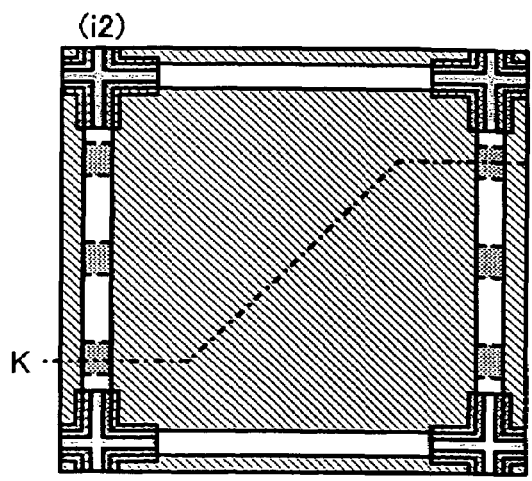

DIRECTION OF LIGHT POLARIZATION OF 1 AXIS (2 DIMENTIONS)

DIRECTION OF LIGHT POLARIZATION OF 2 AXES (3 DIMENTIONS)

DIRECTION OF LIGHT POLARIZATION OF 1 AXIS (2 DIMENTIONS)

BULGE SHAPED CONTACT PART OF THIS INVENTION 107

DIRECTION OF LIGHT POLARIZATION OF 2 AXES (3 DIMENTIONS)

BULGE SHAPED CONTACT PART OF THIS INVENTION 107

LIGHT DEFLECTOR, LIGHT DEFLECTION ARRAY, IMAGE FORMING APPARATUS, AND IMAGE PROJECTION DISPLAY APPARATUS

BACKGROUND OF THE INVENTION

1. Field of the Invention

The present invention generally relates to light deflectors, light deflection arrays, image forming devices, and projection type image display apparatuses, whereby the direction of outgoing light compared to incident light is changed. For example, the present invention can be used for image forming devices such as electro-photographic type printers or copiers, or projection type image display apparatuses such as projectors or digital theater systems.

2. Description of the Background Art

As a type of light deflector, which moves or transforms a mirror using an electrostatic force, a torsion beam type digital micro mirror device (DMD) has been proposed by L. J. Hornbeck et al. The DMD is a device including a beam and a mirror with a hinge. The beam is twisted at the hinge by electrostatic force. The electrostatic force occurs as a result of different electric potentials applied between electrodes facing each other at a plane surface over an air space. As a result of this, the mirror surface is changed, and therefore light deflection is performed. In addition, the details of the DMD are described in "Proc. SPIE Vol. 1150, pp. 86-102, 1989".

In addition, as a product using the DMD, a projection type image display apparatus is described in "A MEMS-Based Projection Display Proceedings Of The IEEE, Vol. 86, No. 8, August 1998, page 1687 to page 1704". Another device, but in which the direction of outgoing light compared to incident light is not changed, is a light valve using a diffraction grating proposed by D. M. Bloom et al. as a typical light modulation apparatus (similar to a light inclination device in a meaning of performing on/off of light). A diffraction grating light valve (GLV) is disclosed in "Optics Letters, Vol. 7, No. 9, pp 688~pp 690", Japanese Patent No. 2941952, Japanese Patent No. 3016871, and Japanese Patent No. 3164824. The GLV, as a device including plural elements, has plural long and narrow ribbons of two groups. The ribbons have a light reflection domain in an appearance. The ribbons of the two groups are changed in height by an electrostatic force to produce a potential difference with electrodes, which face the ribbons over an air space. As a result, diffraction of light occurs, a strength of reflection light varies, and light is modulated. In addition, a projection type image display apparatus with the use of GLV is described in Japanese Laid Open Patent Application No. 2002-131838.

The above-discussed background light deflectors include moving or transforming apparatuses like mirrors or ribbons, which have a fixed edge.

FIG. 1 is a view showing a background art light deflector. FIG. 1A is a top view of the light deflector. FIG. 1B is a B-B' cross-sectional view of FIG. 1. In addition, a light deflector of FIG. 1 is illustrated showing only one light deflector in an array that is arranged in 2 dimensions.

The above described background light deflector is a type in which an incident light beam changes a reflection course in a light reflection area. The light deflector has a substrate 101, plural control members 102, a fulcrum member 103, a plate shape member 104, plural electrodes 105, and an insulation layer 106 (fulcrum member 103 and electrodes 105a to 105d are illustrated with transparency). The plural control members 102 have stoppers in upper parts respectively. The stoppers are provided at plural ends of substrate 101 respectively.

The fulcrum member 103 has a top end, and it is established in the upper side of substrate 101. The plate shape member 104 does not have a fixed edge. In addition, the plate shape member 104 has a light reflection area and a conductive material layer of a member having electroconductivity in at least one part. Plate shape member 104 is deployed to move in the space between insulation layer 106 and fulcrum member 103, but has its movement stopped by the stoppers. The plural electrodes 105 are formed on top of the substrate respectively. In addition, the plural electrodes 105 face a conductive material layer of plate shape member 104. Applying different electrical potentials to the electrodes 105 controls an inclination or slant of the plate shape member 104.

The above-described light deflector has the following advantages:

(a) Control of an inclination corner of a mirror (plate shape member 104) is easy and stable with a dip angle being determined by contact of a fulcrum member and a substrate and a plate shape member, (b) Reply speed of inclining plate shape member of a film to turn fast at high speed by applying different electrical current potentials to the electrodes can be achieved, (c) The plate shape member does not have a fixed edge, and thereby there is little long-term deterioration, and the plate shape member can be driven by a low voltage, (d) There are few shocks by a collision with a stopper as the stopper is small, and a lightweight plate shape member can be formed by a semiconductor process, and there is a little long-term deterioration, (e) The on/off ratio of reflection light (the S/N ratio in picture machinery, the contrast ratio in picture machinery) can be improved by the constitution of a control member and a plate shape member and its light reflection area, (f) A miniaturization and an integration are possible at a low cost by employing a semiconductor process, (g) A light deflection of 2 dimensions of 1 axis and a light deflection of 3 dimensions of 2 axes are possible by disposing plural electrodes.

FIG. 2 and FIG. 3 are examples of a drive method of the above described background light deflector disclosed in prior application Japanese Patent Application No. 2002-282858.

FIG. 2 shows the condition that a plate shape member is inclined by driving as an example with the light deflector of FIG. 1 to be slanted in the position as shown in FIG. 1. FIG. 2A is a cross-sectional view of A-A' and C-C' in a STEP 1. FIG. 2B is a cross-sectional view of A-A' and C-C' in a STEP 2. In FIG. 2, light deflection movement is performed by changing an electrical current potential applied to electrodes 105a, 105b, 105c, 105d. An occurring electrostatic force (shown by the black arrows) is illustrated by electrical current potential applied as shown in FIG. 2A and FIG. 2B to electrodes 105a to 105d.

FIG. 3 shows a timing chart of applying the electrical current potential to each electrode of FIG. 2. A drive method of a background light deflector and incline displacement movement of plate shape member 104 (in other words a light deflection operation) are explained in FIG. 2 and FIG. 3. At first, in STEP 1 of FIG. 3, high electrical current potential 'a' is applied to electrode 105a, low electrical current potential 'c' is applied to electrode 105b, and middle electrical current potential 'b' is applied to electrode 105c and electrode 105d. Then, the electrical current potential of the plate shape member 104, which has a conductive material layer facing electrode group 105 and that is floating electrically, becomes equal to middle electrical current potential 'b'. Therefore, an electrostatic force does not occur at electrodes 105c and 105d of the ON side, but an electrostatic force occurs at electrodes 105a and 105b of the OFF side as shown in FIG. 2A. As a result, plate shape member 104 slants upward toward the OFF side. This movement may be a reset movement to be made at the beginning of a light deflection movement in addition to being at STEP 1 a serial light deflection movement.

Subsequently, in STEP 2 of FIG. 3, high electrical current potential 'a' is applied to electrode 105c, low electrical current potential 'c' is applied to electrode 105d, and middle electrical current potential 'b' is applied to electrode 105a and electrode 105b. Then, the plate shape member 104 floating electrically becomes equal to electrical current potential 'b'. As a result, an electrostatic force does not occur at electrodes 105a, 105b at the OFF side, but an electrostatic force occurs as shown in FIG. 2B at electrodes 105c and 105d at the ON side. Then, the plate shape member 104 slants upward toward the ON side.

In addition, plate shape member 104 of the above described light deflector may be formed of a single layer in FIG. 1, but it may be preferable to form the plate shape member of plural layers. In addition, in FIG. 2, and the drive of FIG. 3, light deflection movement in an ON direction in 2 dimensions of 1 axis with an OFF direction is described, moving the plate shape member either toward the electrodes 105c, 105d side or electrodes 105a, 105b side. However, the electrodes 105a, 105c side and the electrodes 105b, 105d side the plate shape member 104 can be slanted by changing the voltage applied to electrodes 105a to 105d. In other words, a light deflection of 3 dimensions of 2 axes is possible, if the fulcrum member 103 is arranged as a cone in the center of a light deflector.

FIG. 4 is a view showing a further background art light deflector. In FIG. 4 the plate shape member 104 comes in direct contact with a fulcrum member 103, to constitute a light deflector when applying an electrical current potential to the plate shape member.

FIG. 4A is a top view of a light deflector (but fulcrum member 103 and electrodes 105a to 105d are illustrated with transparence). FIG. 4B is the cross-sectional view of B-B'. In addition, a light deflector described in FIG. 4 is one light deflector in an array that is arranged in 2 dimensions.

FIG. 4 shows a light deflector in which light rays incident on a light reflection area are changed by reflection, by inclining a member having a light reflection area being displaced with an electrostatic force, as in the light deflector of FIG. 1. The light deflector has a substrate 101, plural control members 102, fulcrum member 103, plate shape member 104, and plural electrodes 105. The plural control members 102 have stoppers in the upper parts respectively, and also the plural control members 102 are established in plural ends of substrate 101 respectively. The fulcrum member 103 has a top, and is formed in the upper side of substrate 101. The plate shape member 104 does not have a fixed edge. The plate shape member 104 has a light reflection area and a conductive material layer of at least one part of electroconductivity material. The plate shape member 104 is deployed to be mobile in a space between substrate 101 and fulcrum member 103, and to be stopped by the stoppers. The plural electrodes 105 are provided on top of the substrate respectively, and the plural electrodes 105 face a conductive material layer of the plate shape member 104.

A point of difference from the light deflector of FIG. 1 is in a contact point of a top of fulcrum member 103 contacting at least the back side of plate shape member 104, to have a member having electroconductivity and electrical current potential of plate shape member 104 in contact with fulcrum member 103.

One example of a driving method of the above described background light deflector is explained in FIG. 5 and FIG. 6.

The driving method described in FIG. 5 and FIG. 6 is a background driving method. In the driving method an electrical current potential of plate shape member 104 is given by contact with fulcrum member 103.

FIG. 5 shows the condition that a plate shape member is slanted as shown in the light deflector of FIG. 4. FIG. 5A is the cross-sectional view of A-A' and C-C' at STEP 1. FIG. 5B is the cross-sectional view of A-A' and C-C' at STEP 2.

In FIG. 5, light deflection movement is realized by changing an electrical current potential applied to electrodes 105a to 105d and electrical current potential applied to fulcrum member 103. In addition, an occurring electrostatic force (shown by the black arrows) is illustrated in FIG. 5A and FIG. 5B applied to electrodes 105a to 105d by an applied electrical current potential.

FIG. 6 shows a timing chart of applying an electrical current potential to each electrode of FIG. 5. A drive method of a background light deflector and incline displacement movement of plate shape member 104 (in other words a light deflection operation) are explained in FIG. 5 and FIG. 6.

At first, in STEP 1 of FIG. 6, high electrical current potential X is applied to electrodes 105a and 105b, 0V (the ground electrical current potential) is applied to electrodes 105c and 105d, and the ground electrical current potential is applied to the fulcrum member 103. The fulcrum member 103 includes a laminating with an electroconductivity member or an electroconductivity member, as a structure to which an electrical current potential is applied. The plate shape member 104 coming in contact with the fulcrum member 103 by application of the above-noted electrical current potentials becomes equal with the ground electrical current potential. By it, an electrostatic force does not occur at the electrodes 105c and 105d of the ON side, but occur at the electrodes 105a and 105b of the OFF side, as shown in FIG. 5A. Therefore, plate shape member 104 slants upward toward the OFF side, and is displaced.

In STEP 2 of FIG. 6, high electrical current potential X is applied to the electrodes 105c and 105d, the ground electrical current potential is applied to the electrodes 105c and 105d, and the ground electrical current potential is applied to the fulcrum member 103 continuously. Then, an electrostatic force does not cause the plate shape member 104 to come in contact with the fulcrum member 103 as against electrodes 105a of the OFF side, 105b reaching the ground electrical current potential because it is equal. An electrostatic force occurs as in FIG. 5B at electrodes 105c and 105d of the ON side. Therefore, plate shape member 104 slants upward toward the ON side, and is displaced.

In addition, plate shape member 104 of the above described light deflector can be formed of a single layer in FIG. 4, but may also be formed of plural layers. And also, FIG. 5 and FIG. 6 describe light deflection movement in 2 dimensions of 1 axis to slant toward the electrodes 105c, 105d in the OFF direction and the electrodes 105a, 105b in the ON direction. However, by changing the voltage applied to electrodes 105a to 105d, the plate shape member can be slanted toward the electrodes 105a, 105c in the OFF direction and the electrodes 105b, 105d in the ON direction. In other words, a light deflection of 3 dimensions of 2 axes is possible, if the fulcrum member 103 is arranged as a cone in the center of the light deflector.

In addition, the plate shape member described in FIG. 4, FIG. 5, and FIG. 6 is given electrical current potential via the fulcrum member 103 having electroconductivity, and there is no insulation layer 106 on the fulcrum member 103. Therefore, an electrode must be disposed so that plate shape member 104 does not come in contact with electrodes 105a to 105d on the occasion of slant displacement, as no insulation layer 106 is deployed on the top of electrodes 105a to 105d either.

FIG. 7 is a view of a production process of the light deflector described in FIG. 1. FIG. 7A to 7I are cross-sectional views of B-B' in FIG. 1.

In the production process of FIG. 7A, the fulcrum member 103 is produced to a desired shape. At first a silicon oxidation layer composing fulcrum member 103 is formed on top of substrate 101 by a plasma CVD method using a phototype process method with the use of a photomask having a cardinality gradation property or a phototype process method to make transform heat after the regist pattern formation. Then the fulcrum member 103 is formed afterwards by a dry etching method. Alternatively, a silicon oxidation layer composing fulcrum member 103 can be formed on silicon substrate 101.

FIG. 7B is a view of a production process of the electrodes 105a, 105b, 105c, and 105d described in FIG. 1. Electrodes 105a to 105d are formed with a film of a nitride titanium (TiN) layer. A TiN film layer is made using Ti targeted DC magnetron sputtering method, and is then patternized as electrodes 105a to 105d of a plural number by a phototype process method and dry etching.

FIG. 7C is a view of a production process of the insulating layer 106 on electrodes 105a to 105d, which is a silicon oxidation layer formed by a plasma CVD method on the electrodes 105a to 105d.

FIG. 7D is a view of a production process of a first sacrificial layer 401. A silicon layer which is an amorphous substance, is formed by a sputtering method. A planarization is then executed by processing time control by CMP technology. It is important that a film thickness of an amorphous substance silicon layer left on the top top of fulcrum member 103 is controlled. A remaining amorphous substance silicon layer is the first sacrificial layer 401. In addition, as the sacrificial layer, a polyimide layer or photosensitivity organic layer (a resist layer used generally in a semiconductor process) or plural crystallization silicon layers can be used additionally. And also, as a technique of a planarization, a re-flow method and background method by heat-treatment by dry etching can be used.

FIG. 7E is a view of a production process of the plate shape member. The plate shape member has a high light reflection. The plate shape member is made of an aluminum layer accumulated by sputtering to form conductive material layer 104, which is patternized by a phototype process method and dry etching afterwards.

FIG. 7F is a view of a production process of a second sacrificial layer 402. The second sacrificial layer 402 is made of a silicon layer that is an amorphous substance by a sputtering method. In addition, a polyimide layer or photosensitivity organic layer (a resist layer used generally in a semiconductor process) or plural crystallization silicon layers can be used additionally as the sacrificial layer.

FIG. 7G is a view of a production process of the control member 102 having circumferential stoppers that separate individually the light deflector plate shape member 104. By a phototype process method and dry etching, the first sacrificial layer 401 and the second sacrificial layer 402 are compared with plate shape member 104 simultaneously, and are at least somewhat patternized.

FIG. 7H is also a view of a production process of arranging the stoppers around the control member 102. A silicon oxidation layer composing control member 102 having a stopper is formed by a plasma CVD method. By a phototype process method and dry etching, a silicon oxidation layer is patternized afterwards at arbitrary points. In addition, control member 102 having a stopper is not confined to the arrangement shown in FIG. 1. It is preferable that control member 102 is positioned leaving an air space above plate shape member.

FIG. 7I is a view of a production process to be completed for a light deflector. An etching removes the remaining first sacrificial layer 401 and the second sacrificial layer 402 by a wet etching method through an aperture part, to provide a mobile range disposed above plate shape member 104 in an air space. A light deflector is completed therefore. The etching is not limited to wet etching, and sacrificial layer etching can be carried out by dry etching depending on a kind of the sacrificial layer. In addition, as for the sacrificial layer etching, selecting the etching materials is important, as is optimizing materials of plate shape member 104, to make the etching proceed in a substrate planar orientation.

As for the advantages of the above described light deflector, the plate shape member 104 contributing to a light deflection does not have a fixed edge. Therefore, light deflection movement is not accompanied with transformation displacement of a plate shape member (in other words it is exhausted, and it is transformed, and it is twisted, and it is transformed). However, the structure has problems, too. A plate shape member not having a fixed edge moves in an air space limited with a control member. As a result the following problems occur.

FIG. 8 and FIG. 9 are views showing the details of control member 102 at the point D of a light deflector of FIG. 1, and plate shape member 104. FIG. 8 shows the good case that plate shape member 104 does not come in contact with control member 102 having a stopper. FIG. 9 shows a bad case that the plate shape member 104 not having a fixed edge is moved, and completely touches a corner part of control member 102. FIG. 8A and FIG. 9A are top views. FIG. 8B and FIG. 9B are slant views. FIG. 8C and FIG. 9C are cross-sectional views of E-E'.

In FIG. 8 and FIG. 9, 102a is a stopper composed in the upper part of control member 102, and 102b is a support member independently supporting control member 102. In the ideal case described in FIG. 8, friction to prevent movement does not act on the plate shape member 104 as it is displaced around the fulcrum member 103, because plate shape member 104 does not contact support 102b.

On the other hand, in the case the plate shape member 104 shown in FIG. 9 completely comes in contact with control member 102 in a corner part, a frictional force acts on a movement against displacement of plate shape member 104 as it comes in contact with support member 102b of control member 102 (the white arrow in FIG. 9C). As the size of the control member 102 in a light deflector is comparatively small, when a driving voltage is comparatively high, about several tens of volts, the counter-force of friction does not have a great influence. However, when a driving voltage is comparatively low, about several volts to several tens of volts, there is a possibility of a false operation because of the counter-force of friction, and then a normal slant displacement of plate shape member 104 may not be generated. Paradoxically, an increase in a driving voltage reduces the influence of the frictional force.

The following description is another problem that may occur in plate shape member 104 that does not have a fixed edge with reference to FIG. 10. FIG. 10 is a view of the details of control member 102 shown in the point D of FIG. 1. In the state that a voltage is not applied to electrodes 105a to 105d (initial state), a condition arises in stopper 102a that plate shape member 104 is deployed against the control member 102 upper part.

The plate shape member 104 can move anywhere freely because it is not fixed. When the plate shape member 104 is furthest from electrodes 105a to 105d, the position of the plate shape member 104 becomes as shown in FIG. 10. FIG. 10A is a slant view, and FIG. 10B is a cross-sectional view of E-E'. In FIG. 10, because the plate shape member 104 contacts stopper 102a at a surface, the fixing strength, which is dependent upon surface energy of a layer to contact, begins to act. Then, in an early reset movement shown in FIG. 2A, the voltage to be applied to electrodes 105a to 105d increases to add an electrostatic force to overcome a fixing strength.

As above described, there are drawbacks in the background light deflector making a driving voltage increase by the plate shape member coming in contact with the control member and to overcome the fixing strength.

FIG. 11 is a view of another background light deflector. Problems of this light deflector will be described as follows. FIG. 11A is a top view of a light deflector (but fulcrum member 103 and electrode 105a to 105d are illustrated with transparence). FIG. 11B is a cross-sectional view of B-B'. In addition, a light deflector described in FIG. 11 shows only one light deflector of an array arranged in 2 dimensions. The light deflector described in FIG. 11 shows a constitution approximately similar to the light deflector described in FIG. 1. The point of difference is that the light deflector described in FIG. 11 is a light deflector that can move in only 2 dimensions on 1 axis. Therefore, the fulcrum member 103 is a point having a ridge shape of a length approximately the same as a plate shape member in a light deflection axis direction.

False movement of a light deflection outside a target direction can be restrained by composing fulcrum member 103 to have a ridge shape of a long span. However, there is the following problem by composing fulcrum member 103 to have a ridge shape of a long span.

FIG. 12 is a view of the details of the fulcrum member 103 and the plate shape member 104 of the light deflector described in FIG. 11. FIG. 12A is a top view. FIG. 12B is a cross-sectional view of G-G'. FIG. 12C is a cross-sectional view of H-H'. In FIG. 12, because the plate shape member 104 comes in contact with the fulcrum member 103 along a line, a fixing strength (as shown by the white arrows in FIG. 12C) from surface energy of a layer touching at a contact part arises. Such a fixing strength becomes an obstacle to incline displacement of plate shape member 104. Thereby, an electrostatic force to overcome the fixing strength has to be added. As thus described, a background light deflector has a drawback to make a driving voltage increase by coming in contact with a fulcrum member and to overcome a fixing strength.

Another problem is explained in the light deflector of FIG. 11. FIG. 13 shows the details of fulcrum member 103 and plate shape member 104 and electrodes 105 and insulation layer 106 of the light deflector described in FIG. 11. FIG. 13A is a top view. FIG. 13B is a cross-sectional view on G-G'. FIG. 13C is a cross-sectional view on I-I'.

In FIG. 13, because the plate shape member 104 comes in contact with the insulation layer 106 along a line, the fixing strength (as shown by the white space arrows in FIG. 13C) from surface energy of layers touching in a contact part arises. Such a fixing strength becomes an obstacle to incline displacement of plate shape member 104. Thereby, an electrostatic force to overcome the fixing strength has to be added. As thus described, a background light deflector has a drawback to make a driving voltage increase by coming in contact with a fulcrum member. As thus described, a background light deflector has a further drawback to make a driving voltage increase by coming in contact with the substrate or the insulation layer on a substrate.

The above described background light deflectors has such drawbacks.

SUMMARY OF THE INVENTION

One object of the present invention is to provide a novel light deflector that can be possibly driven at a lower voltage.

Another object of the present invention is to provide a novel light deflector that can be driven by a low voltage by reducing a contact area with a plate shape member and other members. More particularly, a frictional force and fixing strength are reduced at a contact area with a control member deployed around a plate shape member and the plate shape member. The fixing strength is reduced at a contact area with a fulcrum member and the plate shape member. Also, the fixing strength is reduced at a contact area with a substrate (or an insulation layer on a substrate) and the plate shape member.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 2A and 2B are cross-sectional views showing a background method for driving a light deflector disclosed in FIG. 1;

FIGS. 5A and 5B are cross-sectional views showing a background method for driving a light deflector disclosed in FIG. 4;

FIG. 6 is a timing chart of electric potentials applied to electrodes in the background method for driving the light deflector disclosed in FIG. 4;

FIGS. 7A and 7I are views showing a production manufacturing process of a light deflector disclosed in FIG. 1;

FIGS. 8A-8C are views showing an example of a plate shape member that does not make contact with a control member;

FIGS. 9A-9C are views showing an example of a plate shape member that makes contact with a control member;

FIGS. 12A-12C are views showing an example of a plate shape member that makes contact along a line with a fulcrum member;

FIGS. 13A-13C are views showing an example of a plate shape member that makes contact along a line with an insulating film when the plate shape member is inclined;

FIGS. 14A-14D are views showing a background art control member;

FIGS. 15A-15D are views showing a control member of a first embodiment of the present invention;

FIGS. 16A-16D are views showing a control member of a second embodiment of the present invention;

FIGS. 17A-17D are views showing a control member of a third embodiment of the present invention;

FIGS. 18A-18D are views showing a control member of a fourth embodiment of the present invention;

FIGS. 19A-19D are views showing a control member of a fifth embodiment of the present invention;

FIGS. 20A-20C are views showing a control member of a sixth embodiment of the present invention;

FIGS. 21A-21C are views showing a control member of a seventh embodiment of the present invention;

FIGS. 22A-22D are views showing a control member of an eighth embodiment of the present invention;

FIGS. 23A-23C are views showing a control member of a ninth embodiment of the present invention;

FIGS. 24A-24C are views showing a control member of a tenth embodiment of the present invention;

FIGS. 28A-28C are views showing a fulcrum member of a twelfth embodiment of the present invention;

FIGS. 29A-29C are views showing a fulcrum member of a thirteenth embodiment of the present invention;

FIGS. 33A-33C are views showing a convex contact area of a convex contact member of a sixteenth embodiment of the present invention;

FIGS. 34A-34C are views showing a drawback using one convex contact member of the sixteenth embodiment of the present invention;

FIGS. 37A-37C are views showing a convex contact area of a convex contact member of an eighteenth embodiment of the present invention;

FIGS. 40(g1) to 40(i2) show a production manufacturing process of a light deflector of the first embodiment of the present invention;

FIGS. 41(a1) to 40(c2) show a production manufacturing process of a light deflector of the eleventh embodiment of the present invention;

FIGS. 42(d1) to 42(f2) show a production manufacturing process of a light deflector of the eleventh embodiment of the present invention;

FIGS. 43(g1) to 43(i2) show a production manufacturing process of a light deflector of the eleventh embodiment of the present invention;

FIGS. 44(a1) to 44(c2) show a production manufacturing process of a light deflector of the sixteenth embodiment of the present invention;

FIGS. 45(d1) to 45(f2) show a production manufacturing process of a light deflector of the sixteenth embodiment of the present invention;

FIGS. 46(g1) to 46(i2) show a production manufacturing process of a light deflector of the sixteenth embodiment of the present invention;

DETAILED DESCRIPTION OF THE PREFERRED EMBODIMENTS

Figure 1A:
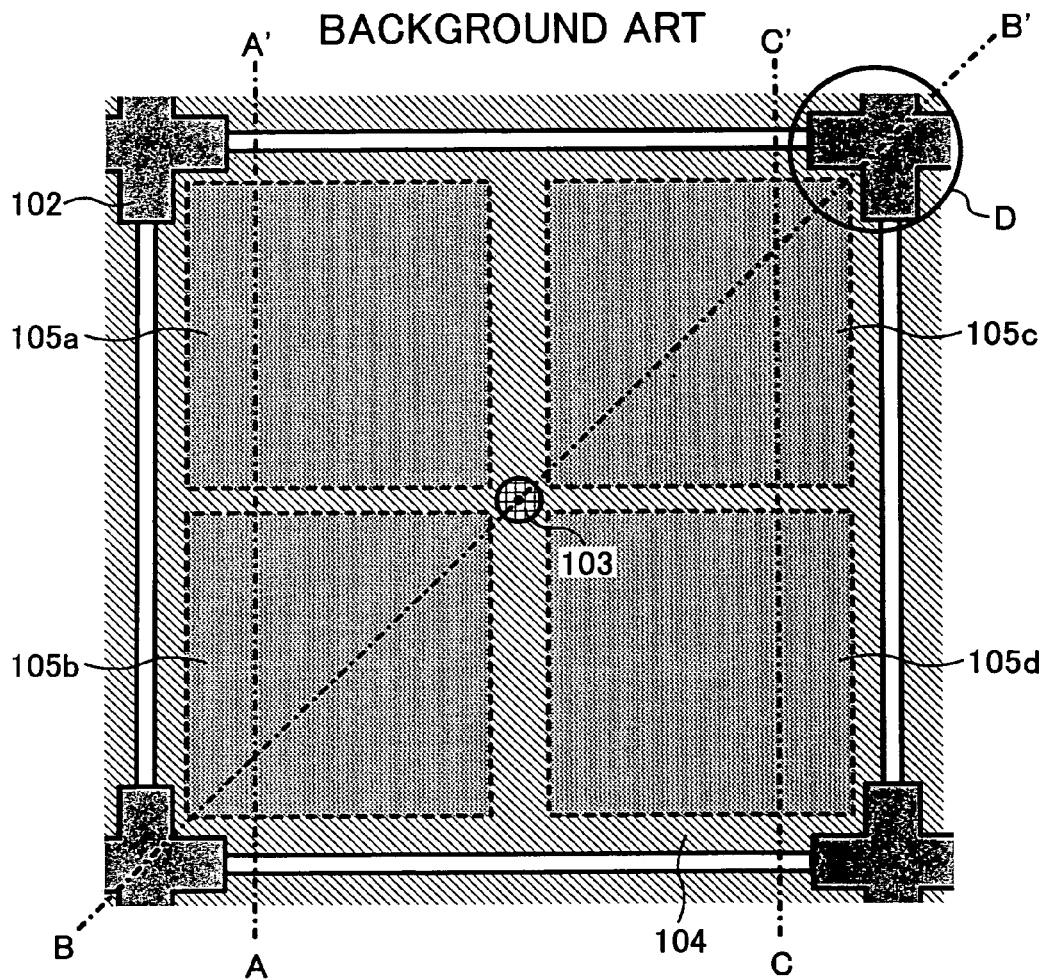
FIGS. 1A and 1B show a first background art light deflector.
Figure 1B:
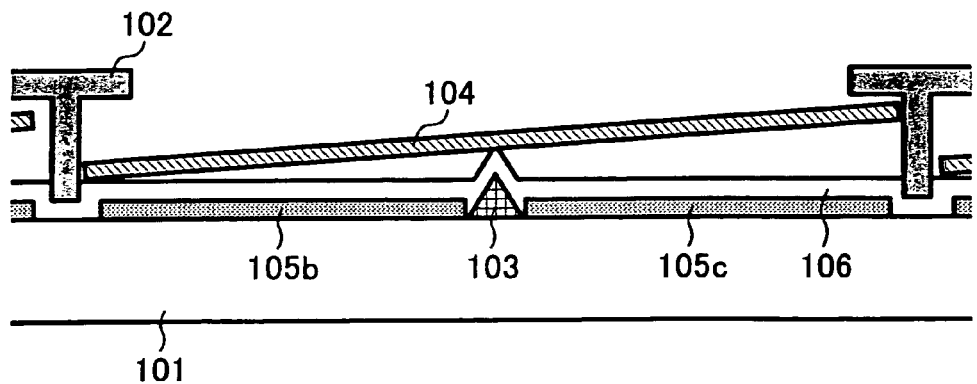

A description will now be given, with reference to drawings of embodiments of the present invention in which like reference numerals indicate identical or corresponding parts throughout the several views. A light reflector of the present invention includes a control member with a stopper, a fulcrum member, and a contact area on a substrate.

In addition, on the control member having a stopper and the fulcrum member, the constitution materials and a production method and a production manufacturing process are similar as in the previously described background light deflectors. Furthermore, the light deflection system and method to apply a driving voltage (a driving method) are also similar with previously described background light deflectors.

The description of the characteristic points of present invention, a control member with stopper, a fulcrum member, and contact area on a substrate, will be described in comparison with the background art.

FIG. 14 is a view showing a structure of the background control member, and FIG. 15 is a view showing a structure of the control member of the present invention. In each case the control member 102 is allocated at the plural edges of a substrate, in other words, around a plate shape member. The following description describes as an example the control member 102 allocated at all 4 edges of the substrate, but it is not limited to this structure. As another example, the control member 102 can be allocated at any point on each side of the substrate. In other words, there is no problem if the plate shape member is allocated at other areas to limit the mobility of the plate shape member 104, and such can be applied for the other embodiments.

FIG. 14A and FIG. 15A are top views of any one of control members 102, and FIG. 14B and FIG. 15B are each cross-sectional views of A-A'. Also, FIG. 14C and FIG. 15C are each cross-sectional views of B-B', and FIG. 14D and FIG. 15D are each cross-sectional views of C-C'.

In the background control member 102 described in FIG. 14, the stopper 102a is structured at all areas of the control member, and the support 102b is provided at all areas of the control member. Therefore, as above described, a relatively large frictional force and fixing strength may arise, and the driving voltage needs to be increased.

The control member 102 and every support 102b of present invention described in FIG. 15 has a characteristic of a divided structure, and the divided support 102b has a quadrangle form described in FIG. 15A, so that at portions the support 102b is not formed, and specifically the support 102b is not formed where it would contact plate shape member 104. Therefore, the contact area is decreased as the plate shape member 104 will not contact support 102b at the divided portion. As a result, the frictional force is decreased and the driving voltage is also decreased.

FIG. 16, FIG. 17, FIG. 18, and FIG. 19 are views of each of control members described in second, third, fourth, and fifth embodiments of the present invention. FIG. 16A, FIG. 17A, FIG. 18A, and FIG. 19A are top views of control members 102. FIG. 16B, FIG. 17B, FIG. 18B, and FIG. 19B are each cross-sectional views of A-A', FIG. 16C, FIG. 17C, FIG. 18C, and FIG. 19C are each cross-sectional views of B-B', and FIG. 16D, FIG. 17D, FIG. 18D, and FIG. 19D are each cross-sectional views of C-C'.

The second, third, fourth, and fifth embodiments of the present invention also have a characteristic of a divided support 102b to limit contact with the plate shape member 104.

The divided support member 102b has a circular cylinder shape as described in FIG. 16A, FIG. 17A, FIG. 18A, and FIG. 19A. With such a structure, as any contact point between the plate shape member 104 and support 102b is on a circular surface, the contact area between the divided fulcrum member 102b and the plate shape member 104 is significantly reduced. Therefore, the frictional force is decreased and the driving voltage can also be decreased. FIG. 16, FIG. 17, FIG. 18, and FIG. 19 are views of some examples for a number of divided fulcrum members 102b and shapes of stopper 102a. The shape of the plate shape member 104 and/or the size of the control member 102 can be varied as needed.

FIG. 20 and FIG. 21 are views of each of control members of sixth and seventh embodiments of the present invention. FIG. 20A and FIG. 21A are top views of control members 102. FIG. 20B and FIG. 21B are each cross-sectional views of A-A', FIG. 20C, and FIG. 21C are each cross-sectional views of C-C'.

The sixth and seventh embodiments of the present invention have a characteristic that each control member 102 has a stopper 102a in conjunction with a divided support 102b, as described in FIG. 20A or FIG. 21A. With such a structure, an area of stopper 102a can be reduced in size, but the plate shape member 104 still does not extend beyond stopper 102a, and yet the contact surface between the stopper 102a and the plate shape member 104 can be reduced. Therefore, the fixing strength between the stopper 102a and the plate shape member 104 is decreased, and the driving voltage can also be decreased.

FIG. 22, FIG. 23, and FIG. 24 are views of control members described in eighth, ninth, and tenth embodiments of the present invention. FIG. 22A, FIG. 23A and FIG. 24A are top views of control members 102. FIG. 22B, FIG. 23B and FIG. 24B are each cross-sectional views of A-A', FIG. 22C is a cross-sectional view of C-C', FIG. 23C and FIG. 24C are each cross-sectional views of E-E', and FIG. 22D is a cross-sectional view of D-D'.

The eighth, ninth, and tenth embodiments of the present invention have a characteristic that each stopper 102a of the plural control members has a divided structure with bridging portions between any divided support members 102b. With such a structure, an area of stopper 102a can be reduced, so that the plate shape member 104 still does not extend past stopper 102a, and the control member 102 is still supported by the bridging structure. Therefore, self-sustainability of the control member 102 improves. As a result, the driving voltage can be decreased and the structure of the control member 102 is strong and is hard to damage. FIG. 22, FIG. 23, and FIG. 24 are views of some examples for the shape of stopper 102a. The shape of the plate shape member 104 and/or the size of the control member 102 can be varied as needed.

Figure 10B:
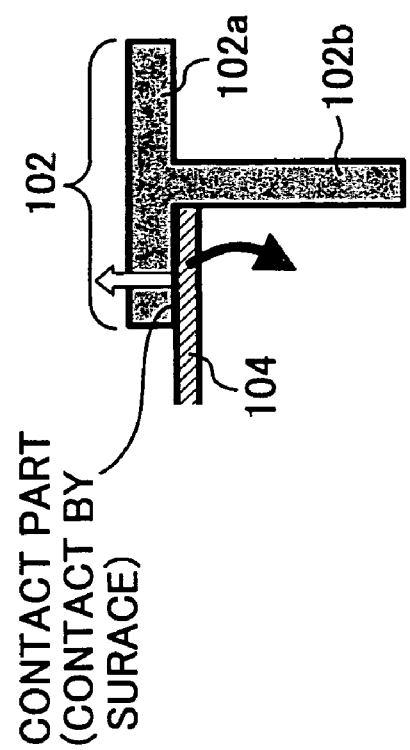
FIGS. 10A and 10B are views showing a plate shape member that makes contact with a stopper.
Figure 10A:
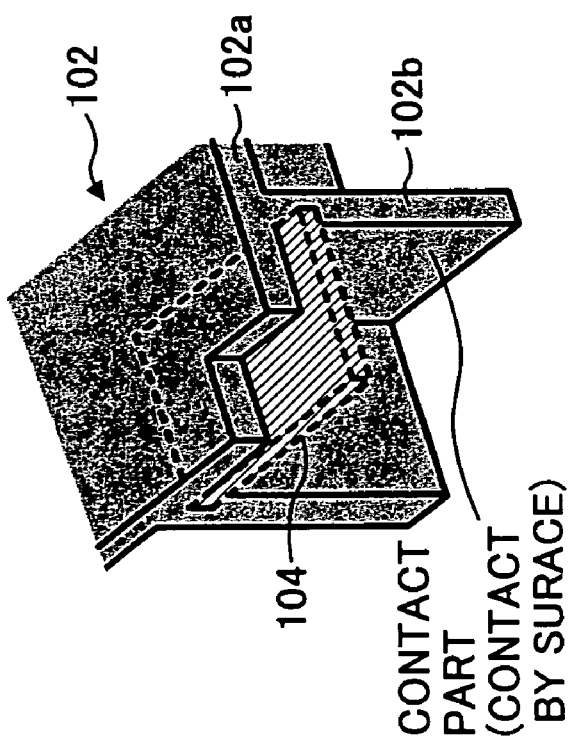
Figure 25A:
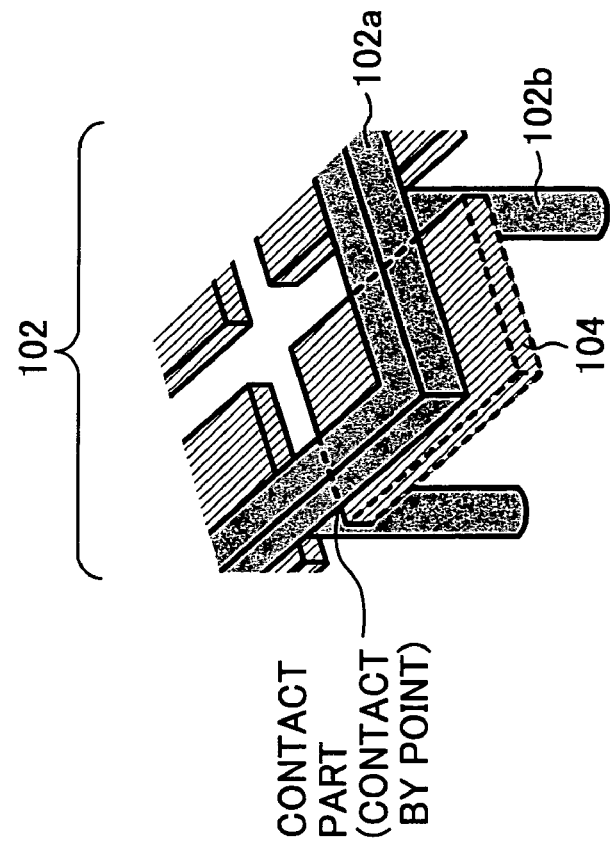
FIGS. 25A-25B are views showing a control member disclosed in FIG. 24 that makes contact with a plate shape member.
Figure 25B:
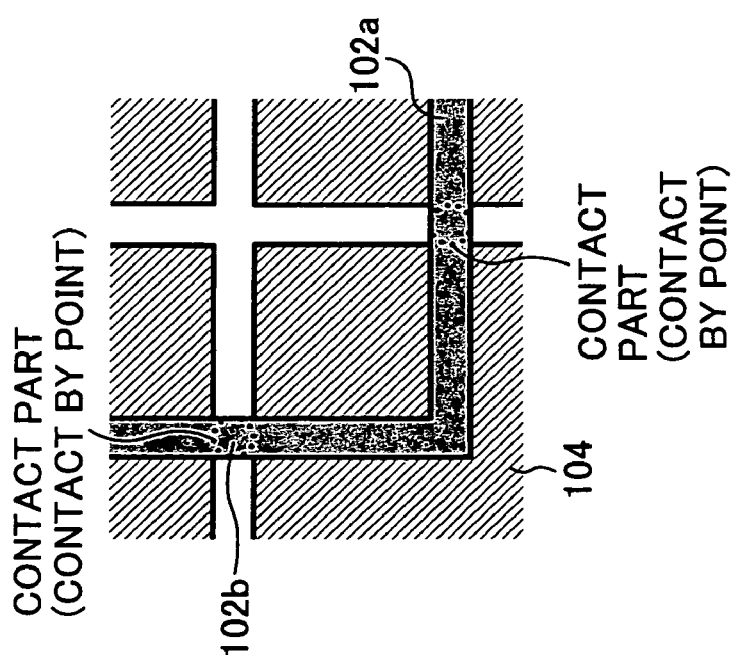

A description of an advantage of the present invention using a control member described in a tenth embodiment is now discussed. FIG. 25 is a view showing a control member disclosed in FIG. 24 making contact with a plate shape member 104. FIG. 25A is a top view of any one of control members 102, and FIG. 25B is a slant view of the any one of control members 102. As shown in these figures, the contact area between the control member 102 and the plate shape member 104 is significantly reduced compared with the background control member 102 described in FIG. 9 or FIG. 10. Therefore, the contact area between the plate shape member 104 and the control member 102b is at a small area. As a result, the frictional force and the fixing strength are decreased, and thereby the device can be driven with a lower voltage.

Figure 11A:
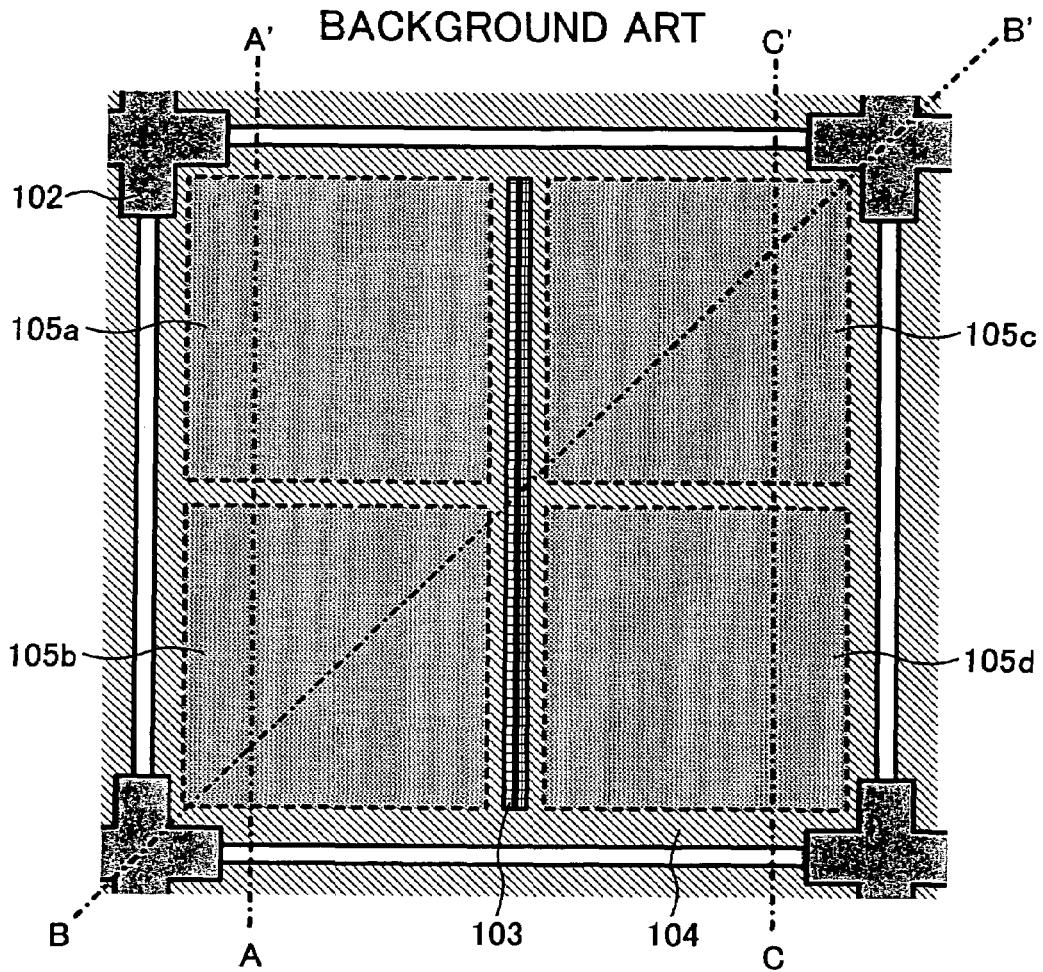
FIGS. 11A and 11B show a third background art light deflector.
Figure 11B:
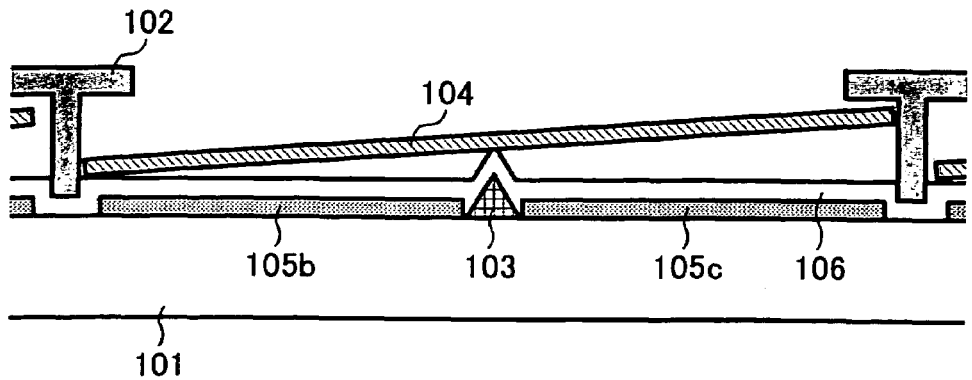

A description is now made of a fulcrum member related to an embodiment of the present invention. FIG. 26 shows a background fulcrum member 103 (background art described in FIG. 11), and FIG. 27 shows a fulcrum member 103 of an eleventh embodiment of the present invention. The fulcrum member 103 is formed on top of the insulating layer 106 on the substrate. The plate shape member 104 is included around or at the fulcrum member 103.

Figure 26B:
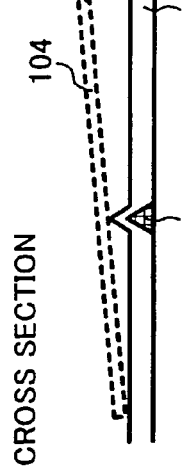
FIGS. 26A-26C are views showing a background art fulcrum member.
Figure 26C:
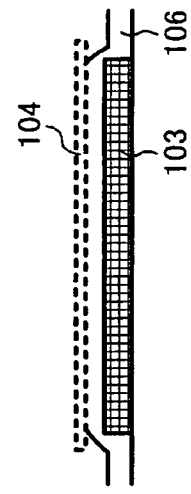
Figure 27B:
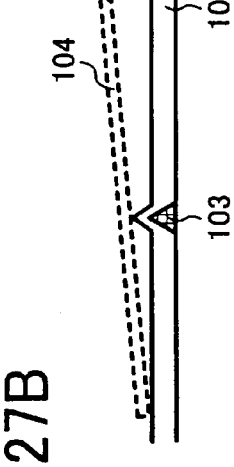
FIGS. 27A-27C are views showing a fulcrum member of an eleventh embodiment of the present invention.
Figure 27C:
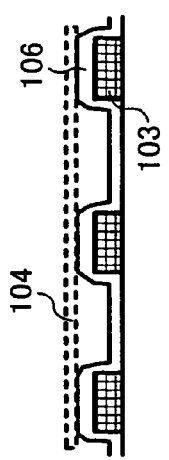
Figure 26A:
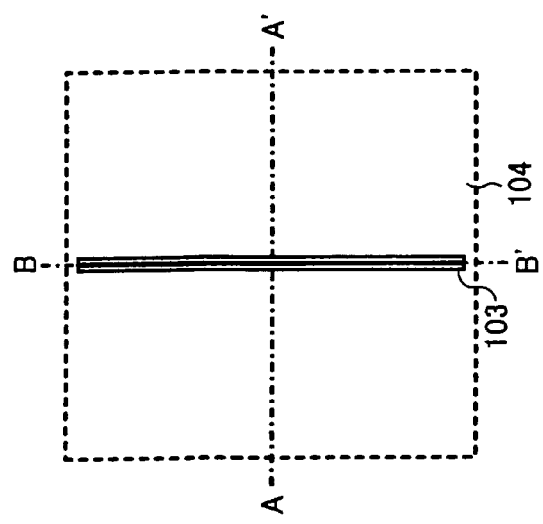
Figure 27A:
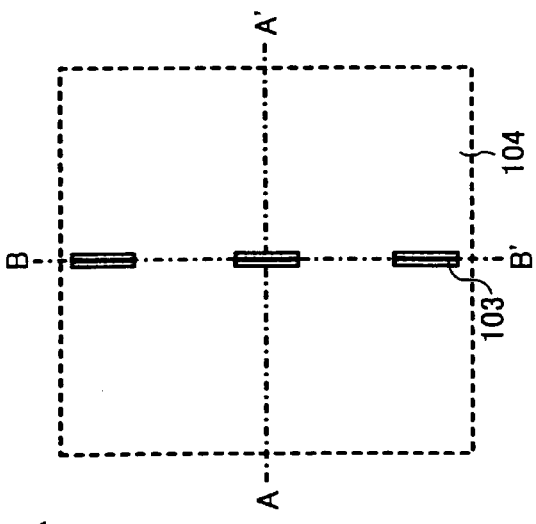

FIG. 26 and FIG. 27 are top views showing the fulcrum member 103 and the plate shape member 104, and FIG. 26A and FIG. 27A show the plate shape member 104 with a dotted line. FIG. 26B and FIG. 27B are cross-sectional views of A-A'. FIG. 26C and FIG. 27C are cross-sectional views of B-B'.

In the background fulcrum member 103 shown in FIG. 26, the fulcrum member 103 is composed over substantially a full length of plate shape member 104. Therefore, a comparatively large fixing strength arises by contact of the fulcrum member 103 with plate shape member 104 as described above. As a result, a driving voltage needs to be increased.

Light deflection in the present invention can be light deflection in 2 dimensions around 1 axis. In this case, in this embodiment the fulcrum member is divided into sections as shown in FIG. 27A along an axis of light deflection, and thus multiple sections of a fulcrum member 103 are deployed. In addition, the top of each divided fulcrum member 103 has a ridged shape shown in FIG. 27B and FIG. 27C. The contact surface between the fulcrum member 103 with the plate shape member 104 is thereby reduced with such a structure. Thereby, the fixing strength deteriorates, and the driving voltage can be reduced. In addition, it is advantageous if the plate shape member 104 comes in contact with a top of the fulcrum member 103 having such a linear ridge shape.

In the eleventh embodiment, the number of sections of the fulcrum member 103 is divided into 3. However, in a twelfth embodiment shown in FIG. 28, the fulcrum member 103 is divided into two sections, which may be preferable in some applications. As for the position of fulcrum member 103, the number of partitions, the length of each ridge, such factors will determiner a course of light deflection movement of plate shape member 104, and the arrangement should be such that the plate shape member does not slip off the fulcrum member 103. And, also considering a size, depth, hardness of a plate member, an appropriate arrangement can be found.

Figure 30B:
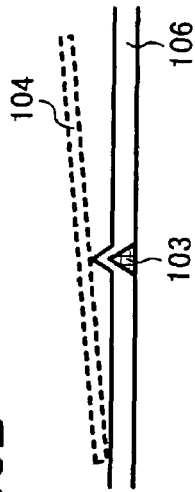
FIGS. 30A-30C are views showing a fulcrum member of a fourteenth embodiment of the present invention.
Figure 30C:
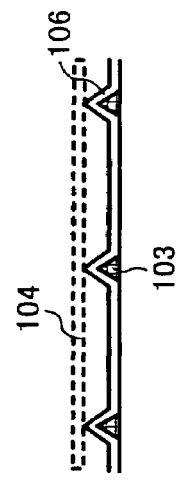
Figure 31B:
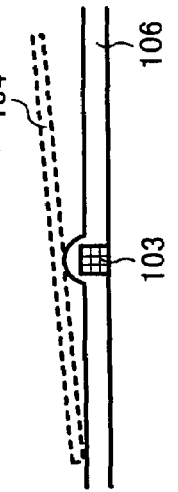
FIGS. 31A-31C are views showing a fulcrum member of a fifteenth embodiment of the present invention.
Figure 31C:
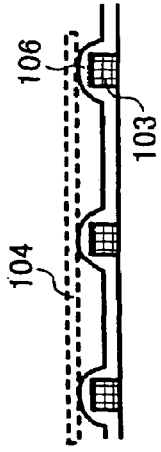
Figure 30A:
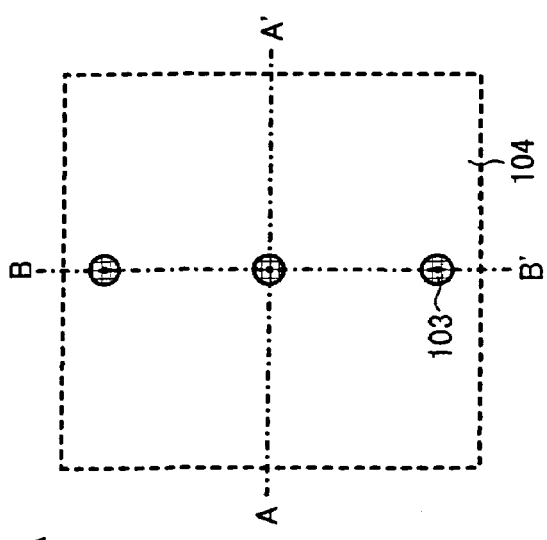
Figure 31A:
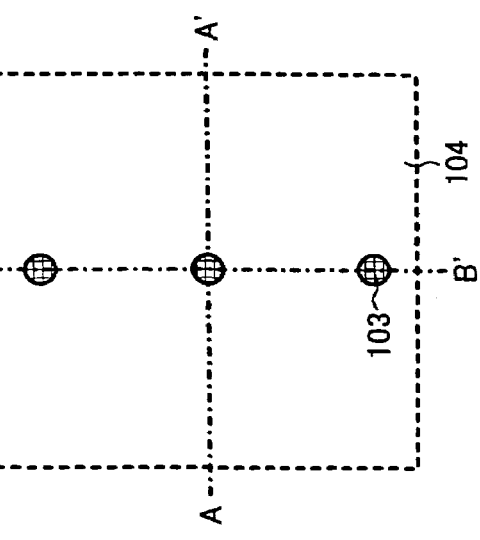

FIG. 29, FIG. 30, and FIG. 31 are views showing respectively, a thirteenth embodiment, fourteenth embodiment, and fifteenth embodiment. FIG. 29A, FIG. 30A, and FIG. 31A are top views of the fulcrum member 103 and the plate shape member 104, in which the plate shape member 104 is illustrated with a dotted line. FIG. 29B, FIG. 30B, and FIG. 31B are cross-sectional views of A-A'. FIG. 29C, FIG. 30C, and FIG. 31C are cross-sectional views of B-B'.

In the thirteenth embodiment of the present invention shown in FIG. 29, each divided fulcrum member 103 has a prism shape. In the fourteenth embodiment of the present invention shown in FIG. 30, each divided fulcrum member 103 is generally cone-shaped. In the fifteenth embodiment of the present invention shown in FIG. 31, each divided fulcrum member 103 has an abbreviated column shape.

The contact surface with the plate shape member 104 is reduced with such structures of each divided fulcrum member 103. Thereby, the fixing strength deteriorates, and the driving voltage can be reduced.

In the thirteenth embodiment of the present invention shown in FIG. 29, the plate shaper member 104 will not easily slip off of divided fulcrum member 103 as it is prism shape, and that structure is also advantageous in that it allows an easy patterning of a fulcrum member (it is unnecessary to form a precise register shape as in FIG. 7A). In the fourteenth embodiment of the present invention shown in FIG. 30, because the divided fulcrum member has a generally cone-shaped, it is advantageous in that the contact surface with a plate shape member can be reduced mostly. In the fifteenth embodiment of the present invention shown in FIG. 31, because the divided fulcrum member has an abbreviated column shape, it is advantageous in that the contact surface with a plate shape member can be reduced relatively, and also it is advantageous in that it allows an easy patterning of a fulcrum member (it is unnecessary to form a precise register shape as in FIG. 7A). In the thirteenth, fourteenth, and fifteenth embodiments the number of partitions of fulcrum member 103 is a division into 3. However, as in the twelfth embodiment shown in FIG. 28, it may be preferable to only have 2 partitions of fulcrum member 103.

Figure 32B:
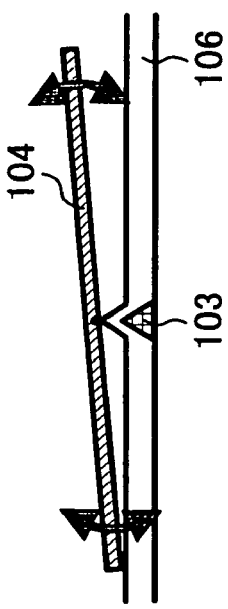
FIGS. 32A-32C are views showing a control member disclosed in FIG. 30 that makes contact with a plate shape member.
Figure 32C:
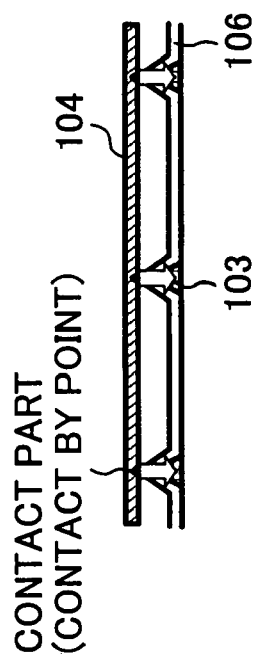
Figure 32A:
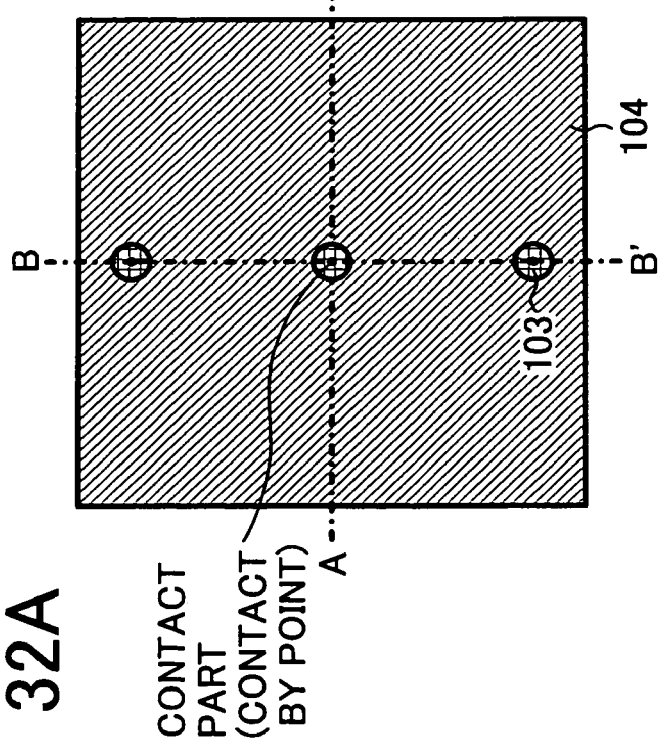

A description is now made of a fulcrum member of a fourteenth embodiment (FIG. 30) of the present invention. FIG. 32 shows a condition of contact of a fulcrum member 103 and the plate shape member 104 of the fourteenth embodiment. FIG. 32A is a top view. FIG. 32B is a cross-sectional view of A-A'. FIG. 32C is a cross-sectional view of B-B'. It is found that the contact surface between the plate shape member 104 and the fulcrum member 103 is reduced largely by the generally cone of shape of the fulcrum member of the present invention in comparison with the background embodiment shown in FIG. 11. Therefore, a fixing strength preventing an inclining movement of the plate shape member (as shown by the white arrows in FIG. 32c) is reduced. Thereby, driving by using a low voltage becomes possible.

A description is now made of a contact area of a convexity shape composed on the substrate of the present invention. The background plate shape member 104 and substrate 101 or a contact area with insulation layer 106 on a substrate is explained in FIG. 13.

FIG. 33 is a figure explaining the contact area 107 of a composed convexity shape on a substrate related to a sixteenth embodiment of the present invention. FIG. 33 shows the fulcrum member 103, the plate shape member 104, the electrode 105, and insulation layer 106 on a substrate of a light deflector of the present invention. FIG. 33A is a top view. FIG. 33B is a cross-sectional view of G-G' at the point F. FIG. 33C is a cross-sectional view of I-I' at the point F.

With the sixteenth embodiment, the contact area 107 of the insulating layer 106 which the plate shape member 104 comes in contact with when it is inclined has a convexity shape. That is, multiple portions in the contact area 107 have a convexity shape of the insulating layer 106 which the plate shape member 104 comes in contact with when inclined. Furthermore, the contact area 107 of the convexity shape of insulating layer 106 is composed by forming plural electrodes on top of the substrate scattered at arbitrary points.

In the background art shown in FIG. 13, the contact area of the plate shape member 104 and the insulating layer 106 is substantially the full length of the plate shape member 104. Therefore, a comparatively large fixing strength arises by contact of plate shape member 104 and insulating layer 106 as described above. As a result a driving voltage needs to be increased.

But with the sixteenth embodiment shown in FIG. 33, because the plate shape member 104 contacts a convexity shape only at locations 107 of the insulating layer 106 when the plate shape member is inclined, the plate shape member 104 has a contact surface with the insulation layer 106 on a substrate that can be decreased in comparison with the background art described in FIG. 13. Therefore, the fixing strength (as shown by the white arrows in FIG. 33C) can be decreased. Thereby, a driving voltage can be reduced because the fixing strength is reduced.

A description is now made of an advantage of using the divided convexity shape contact area 107 of the present invention compared with a convexity shape contact area that is not divided. FIG. 34 explains a drawback of a case using only one convexity shape contact area that is not divided. FIG. 34 shows the fulcrum member 103, the plate shape member 104, electrode 105, and insulation layer 106 on a substrate of a light deflector, as in FIG. 33. FIG. 34A is a top view. FIG. 34B is a cross-sectional view of G-G' at point F. FIG. 34C is a cross-sectional view of I-I' at point F.

In FIG. 34, utilizing a non-divided convexity shape contact area 107 is effective in reducing the contact surface between the plate shape member 104 and the insulating layer 106 in comparison with forming a convexity shape contact area 107 over a long span in contact with a side of plate shape member 104. Therefore, as shown in FIG. 34C, the convexity shape contact area 107 has a short length on a side length of the plate shape member 104 relatively.

When the convexity shape contact area 107 is composed at only one arbitrary point (in FIG. 34, only at a central part), the contact surface product with plate shape member 104 is reduced; however the plate shape member 104 does not only come in contact with the insulating layer 106 in parallel, but comes in contact when inclined as shown in FIG. 34C diagonally. Therefore, a part of plate shape member 104 comes in contact with the insulating layer 106 at an area other than at the contact area 107, a fixing strength increases, and a light deflection course of plate shape member 104 is not stable.

But, as shown in FIG. 33, having disposed a convexity shape contact area 107 with different segments, the plate shape member 104 can control a dispersion of a light deflection direction as it is maintained in parallelism with the substrate.

Figure 35B:
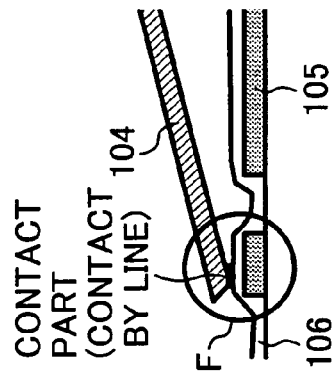
FIGS. 35A-35C are views showing a layout of two convex contact members of the sixteenth embodiment of the present invention.
Figure 35C:
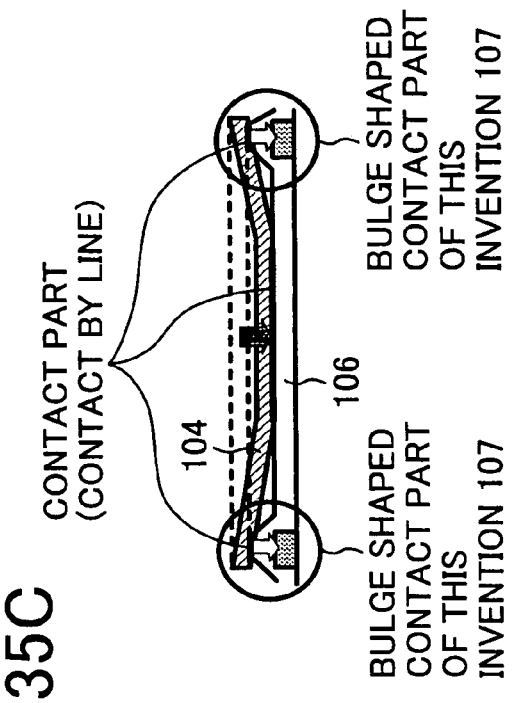
Figure 35A:
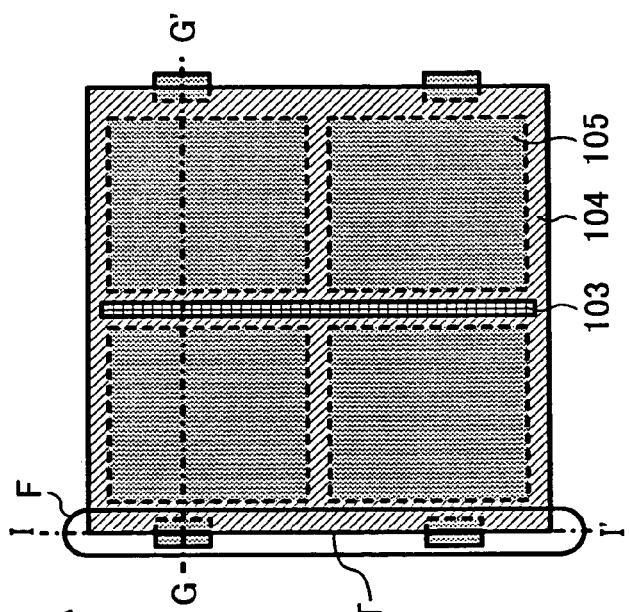

FIG. 35 shows a figure explaining matters that require attention in a case of disposing a divided convexity shape contact area 107. FIG. 35 shows the fulcrum member 103, the plate shape member 104, the electrode 105, and insulation layer 106 on a substrate of a light deflector, as in FIG. 33. FIG. 35A is a top view. FIG. 35B is a cross-sectional view of G-G' at point F. FIG. 35C is a cross-sectional view of I-I' at point F.

A potential problem arises when a divided convexity shape contact area 107 is disposed in the present invention shown in FIG. 35. As shown in FIG. 35C, if an interval of the convexity shape contact area is large, i.e. if the divided portions are spaced far apart from one another, the plate shape member 104 may buckle at areas between the convexity shape contact area 107, so the plate shape member 104 comes in contact with an insulating layer 106 by an electrostatic force for use in incline displacement (as shown by the black arrow in FIG. 35). Such an occurrence will give problems for dispersing a light deflection direction or increasing a fixing strength, similarly as in the previously described FIG. 34. Therefore, it is beneficial to dispose adjacent convexity shape contact areas 107 at an interval (distance) such that the plate shape member 104 avoids such buckling. In addition, the above described interval (distance) can be designed on the basis of a parallelism flat board type electrostatic force transformation model of two points of support by an electrostatic force generated by the incline displacement of the plate shape member 104, height of a convex part, a coefficient of elasticity of the plate shape member 104, and its thickness.

The convexity shape contact part 107 related to the present invention patternizes the contact area of the convexity shape, and differences in grade are composed in a substrate manufacturing process as in forming the plural electrodes, which are patternized to be formed at arbitrary positions in a manufacturing process of above-mentioned FIG. 7B. That is, the convexity shape contact parts are formed by forming extra electrode portions where such convexity shape contact parts are desired. The contact area 107 of the convexity shape can thereby be made without increasing a manufacturing process, and a production cost can be reduced.

Figure 36B:
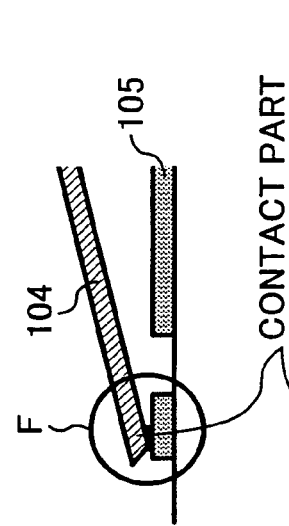
FIGS. 36A-36C are views showing a convex contact area of a convex contact member of a seventeenth embodiment of the present invention.
Figure 36C:
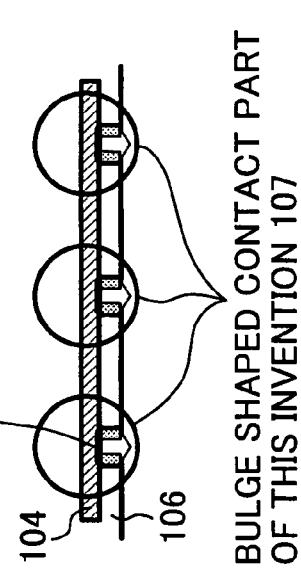
Figure 36A:
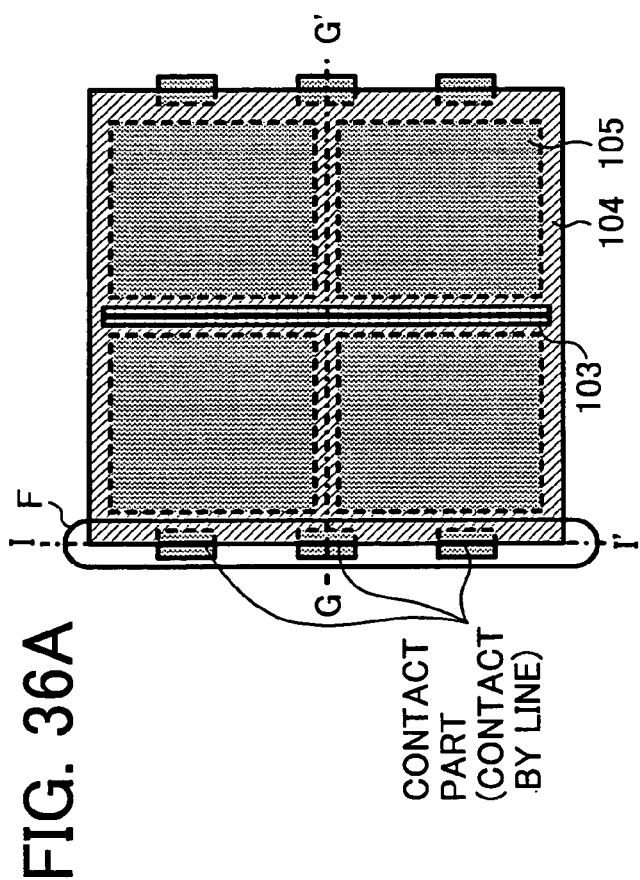

FIG. 36 shows contact area 107 of a convexity shape composed on the substrate top related to a seventeenth embodiment of the present invention. FIG. 36 shows the fulcrum member 103, the plate shape member 104, and electrode 105 of a light deflector of the present invention. FIG. 36A is a top view. FIG. 36B is a cross-sectional view of G-G' at point F. FIG. 36C is a cross-sectional view of I-I' at point F. In the seventeenth embodiment, an insulation layer 106 is not formed on top of conductive material layers of a contact area of a convexity shape and a facing plate shape member 104. The contact area of a convexity shape is divided with plural electrodes composed on the substrate top, and the electrical current potential is generally given to a contact area of a convexity shape with electrical current potential to act on the plate shape member 104.

In the seventeenth embodiment as shown in FIG. 36, an insulation layer 104 is only formed on the substrate between the divided portions on the contact area 107. To be concrete, the insulation layer 106 (a silicon oxidation layer), also formed in the background art described in FIG. 13, is formed on the substrate where the plate shape member 104 contacts contact area 107. Generally, because an adhesive power of an oxidation layer is larger than an adhesive power of a metal layer, a fixing strength increases.

In the seventeenth embodiment, a fixing strength is reduced with plate shape member 104 and a contact area with a substrate of metal layer composing the electrode (for example, an aluminum system metal layer composing a TiN membrane and a plate shape member). As a result, a low voltage drive of a light deflector can be utilized. In addition, as the plural electrodes are divided electrically, an electric short circuit between plural electrodes through a plate shape member can be controlled.

Figure 3:
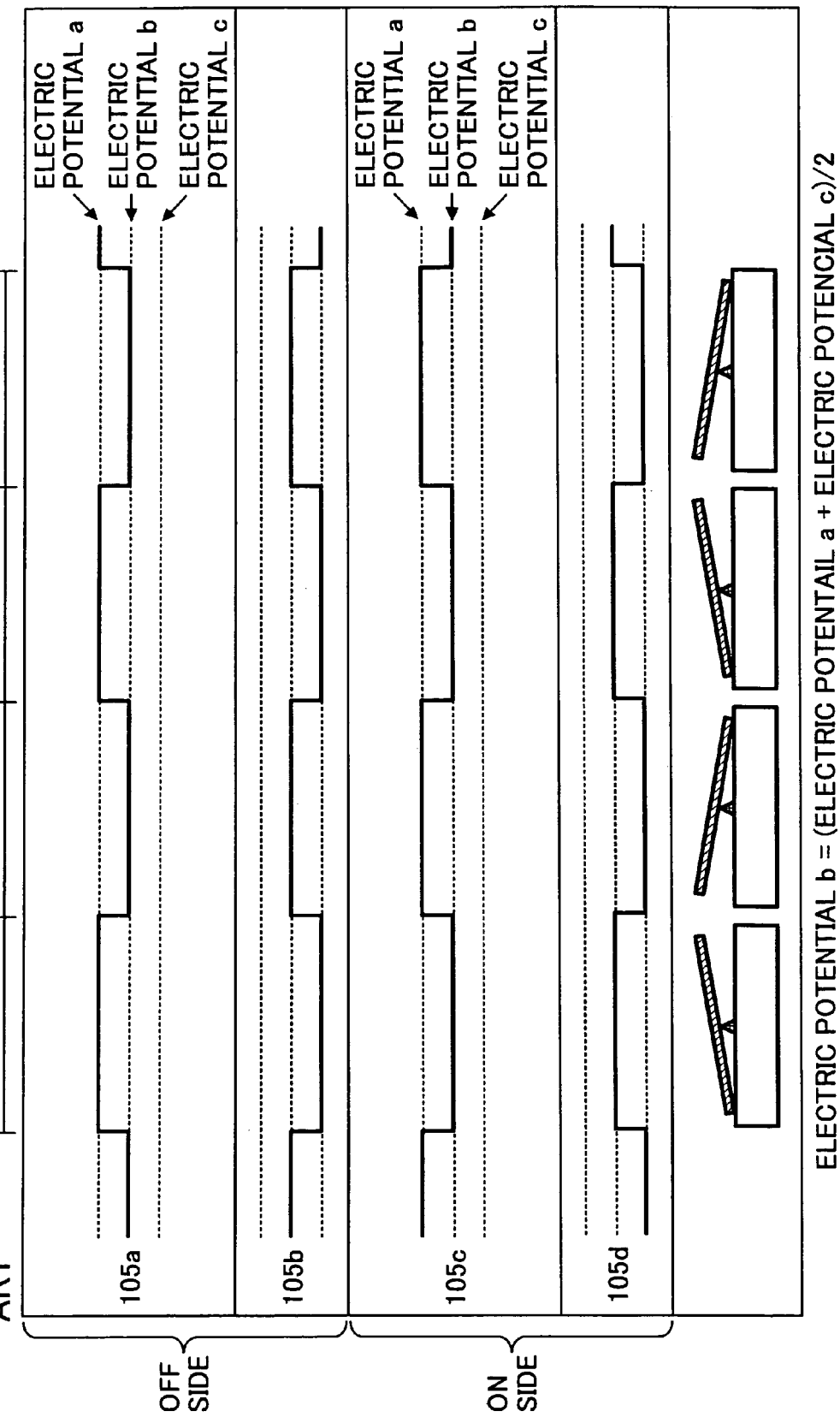
FIG. 3 is a timing chart of electric potentials applied to electrodes in the background method for driving the light deflector disclosed in FIG. 1.
Figure 4A:
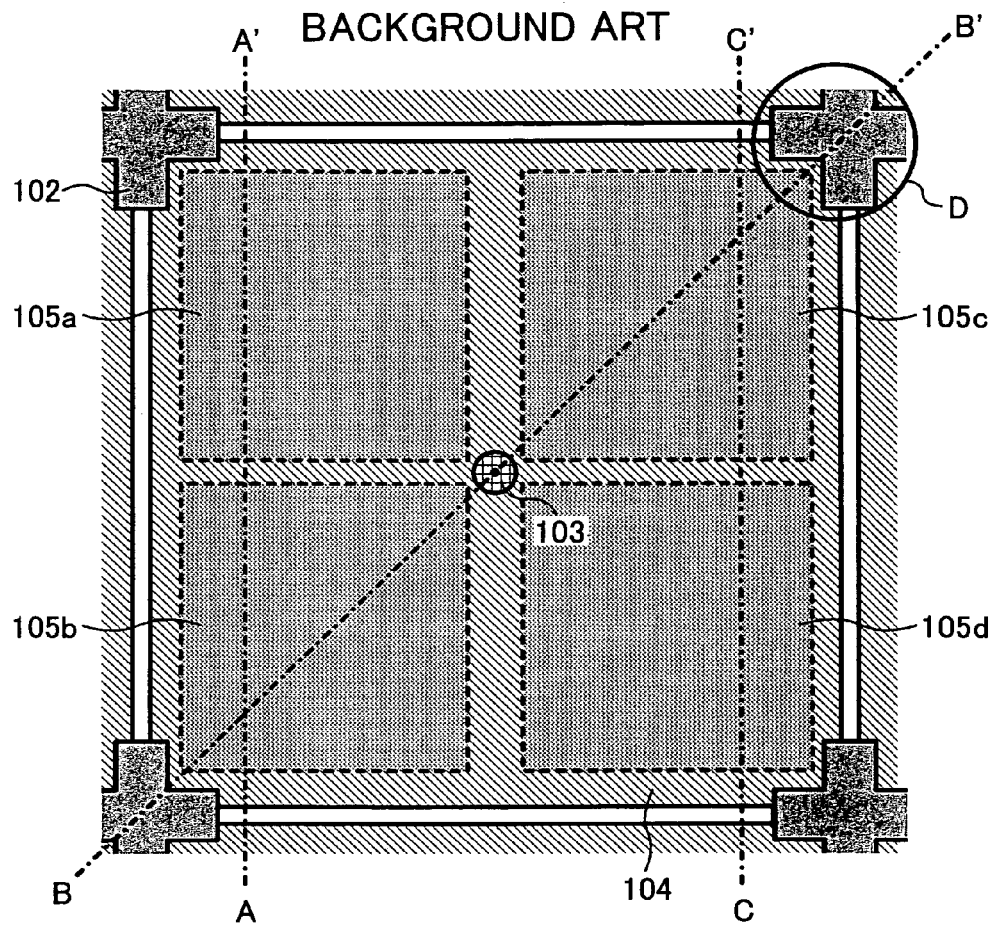
FIGS. 4A and 4B show a second background art light deflector.
Figure 4B:
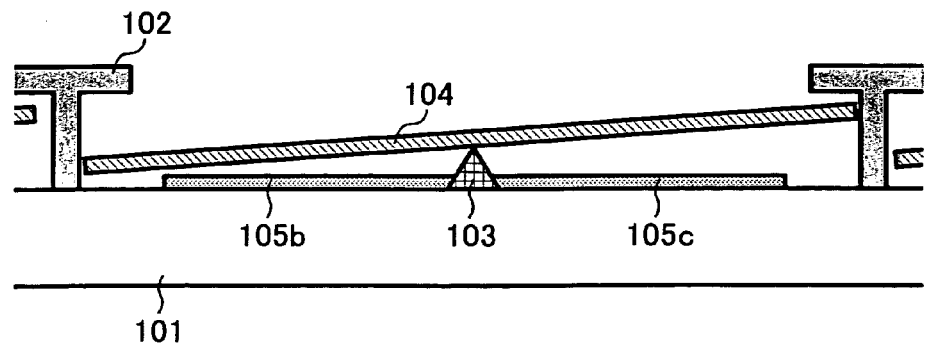

When an electrical current potential of plate shape member 104 is floating electrically (for the case a driving method of a light deflector is the same as in FIG. 3), the electrical current potential of plate shape member 104 is the same as the middle electrical current potential b between the electrical current potential a and the electrical current potential c. In addition, the electrical current potential of plate shape member 104 is the same as the ground electrical current potential when giving an electrical current potential of the plate shape member through the fulcrum member (for the case a driving method of a light deflector is the same as in FIG. 6).

As thus described in the seventeenth embodiment, in each constitution in which the plate shape member 104 does not have a fixed part, is not connected electrically, or the plate shape member 104 is supplied an electrical current potential through the fulcrum member 103, the electrical current potential of plate shape member 104 can be stabilized in contact with contact area 107 of a convexity shape, by generally providing an electrical current potential to act on plate shape member 104 at convexity shape contact area 107. Therefore, drift of an electrical current potential when the plate shape member 104 is inclined can be restrained, and false movement of light deflection movement can be prevented.

FIG. 37 explains a contact area 107 of the convexity shape which is composed above a substrate related to an eighteenth embodiment of the present invention. FIG. 37 shows the fulcrum member 103, the plate shape member 104, and the electrode 105 of a light deflector of the present invention. FIG. 37A is a top view. FIG. 37B is a cross-sectional view of G-G' at point F. FIG. 37C is a cross-sectional view of I-I' at point F. In the eighteenth embodiment, the insulation layer 106 is composed between conductive material layers of the contact area 107 of the convexity shape and faces the plate shape member 104, and among the plural electrodes 105 in contact area 107, a convexity shape is formed on top of the substrate, by extending arbitrarily an electrode electrically.

As shown in FIG. 37B, electrode 105 is electrically connected to contact area 107 of the convexity shape which is characteristic of this embodiment of the invention. An electrostatic force between plate shape member 104 occurring by an electrical current potential applied to electrode 105 is generated at convexity shape contact area 107. As a result, a low voltage drive of a light deflector can be utilized. In addition, when plate shape member 104 comes in contact with convexity shape contact area 107 when inclined, insulation with plate shape member 104 and electrode 105 is realized by disposing insulation layer 106 between plate shape member 104 and convexity shape contact area 107. Also, an electric short circuit of a plural electrodes 105 through plate shape member 104 can be prevented.

In addition, a substrate of the present invention may be desirably composed to form the convexity shape contact area 107 with a member the same as electrode 105, but that need not always be the case. It may be desirable to compose the convexity shape contact area 107 with a member electrode 105, but the convexity shape may be processed into the substrate, and it may be composed by another member. In addition, the convexity shape may preferably not only have a planar shape as explained in the above embodiments, but may also have a column shape or cone shape. Furthermore, a number of partitions of convexity shape contact area 107 is not limited to two or three per one side of a plate shape member.

Figure 38:
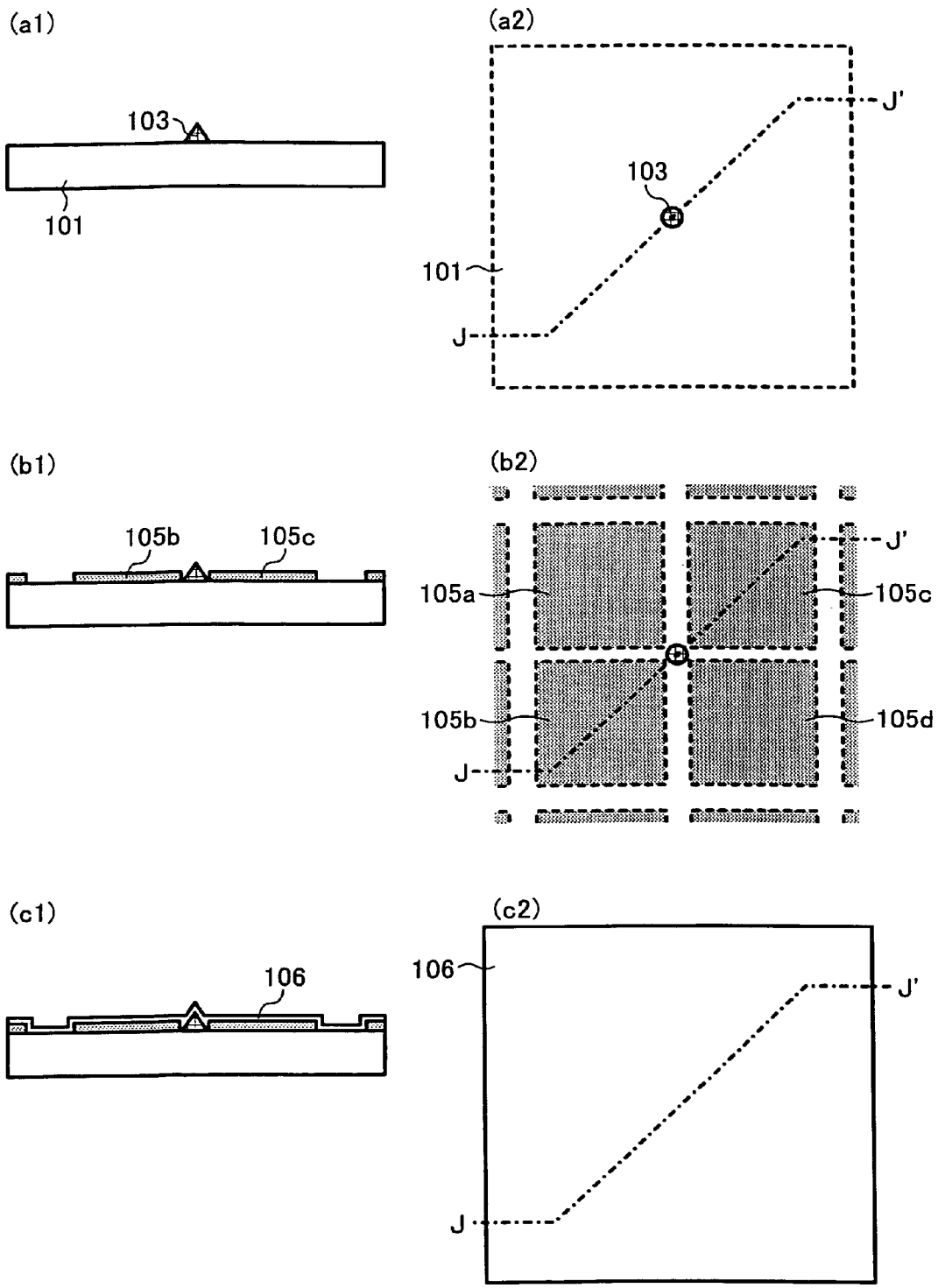
FIGS. 38(a1) to 38(c2) show a production manufacturing process of a light deflector of the first embodiment of the present invention; h FIGS. 39(d1) to 39(f2) also show a production manufacturing process of a light deflector of the first embodiment of the present invention.

Next, a description shows a constitution and a production process of a light deflector using a control member described in the first embodiment (FIG. 15) of the present invention. FIG. 38, FIG. 39, and FIG. 40 show a production manufacturing process of a light deflector of the first embodiment. FIG. 38(*a*1), FIG. 38(*b*1), FIG. 38(*c*1), FIG. 39(*d*1), FIG. 39(*e*1), FIG. 39(*f*1), FIG. 40(*g*1), FIG. 40(*h*1), and FIG. 40(*i*1) are cross-sectional views of J-J'. FIG. 38(*a*2), FIG. 38(*b*2), FIG. 38(*c*2), FIG. 39(*d*2), FIG. 39(*e*2), FIG. 39(*f*2), FIG. 40(*g*2), FIG. 40(*h*2), and FIG. 40(*i*2) are top views.

In the production process of FIG. 38(a1) and FIG. 38(a2), the fulcrum member 103 is produced to a desired shape by forming a silicon oxidation layer composing fulcrum member 103 on top of substrate 101 by a plasma CVD method using a phototype process method with the use of a photomask having a cardinality gradation property or a phototype process method to make transform heat after the resist pattern formation. Then, the fulcrum member 103 is formed afterwards by a dry etching method. The fulcrum member 103 could also be processed by making a silicon oxidation layer composing fulcrum member 103 on silicon substrate 101.

FIG. 38(b1) and FIG. 38(b2) are views of a production process of the electrodes 105a, 105b, 105c, and 105d. Electrodes 105a to 105d are formed with a film of a nitride titanium (TiN) membrane. A TiN film layer is made using Ti targeted DC magnetron sputtering method, which film is then patternized as electrodes 105a to 1 05d of a plural number by a phototype process method and dry etching. In addition, the electrodes can not only be made from TiN, but also from an aluminum system metal layer, for example.

FIG. 38(c1) and FIG. 38(c2) are views of a production process of the insulating layer 106 on electrodes 105a to 105d in which a silicon oxidation layer by a plasma CVD method is formed on the electrodes 105a to 105d.

FIG. 39(d1) and FIG. 39(d2) are views of a production process of the first sacrificial layer 401. A silicon layer which is an amorphous substance is formed by a sputtering method, and then a planarization is performed by processing time control by CMP technology. It is important that a film thickness of an amorphous substance silicon layer left on the top top of fulcrum member 103 then is controlled. An amorphous substance silicon layer remaining is the first sacrificial layer 401. In addition, as the sacrificial layer, a polyimide layer or photosensitivity organic layer (a resist layer used generally by a semiconductor process) or plural crystallization silicon layers can be used in addition to the above layer. And also, as a technique of a planarization, a re-flow method and background method by heat-treatment by dry etching can be used.

FIG. 39(e1) and FIG. 39(e2) are views of a production process of the plate shape member 104. The plate shape member 104 should have high light reflection. The plate shape member is made by forming an aluminum layer by sputtering to form conductive material layer 104. A phototype process method and dry etching patternize it afterwards. In addition, the plate shape member need not always be one layer. The plate shape member may be two or three layers. The plate shape member may have a high reflection and a high coefficient of elasticity by being formed of two or three layers.

FIG. 39(f1) and FIG. 39(f2) are views of a production process of the second sacrificial layer 402. The second sacrificial layer 402 is made of a silicon layer that is an amorphous substance by a sputtering method. In addition, a polyimide layer or photosensitivity organic layer (a resist layer used generally by a semiconductor process) or plural crystallization silicon layers can be used in addition to the above layer as the sacrificial layer.

FIG. 40(g1) and FIG. 40(g2) are views of a production process of the control member 102 having circumferentially a stopper with separate individual portions with a light deflector plate shape member 104. By a phototype process method and dry etching, the first sacrificial layer 401 and the second sacrificial layer 402 are compared with plate shape member 104 simultaneously, and is at least somewhat patternized. In this manufacturing process, divided aperture part 411 corresponding to a fulcrum member of the control member is formed.

FIG. 40(h1) and FIG. 40(h2) are views of a production process of arranging the stopper around the control member 102. A silicon oxidation layer composing control member 102 having a stopper is formed by a plasma CVD method. By a phototype process method and dry etching, a silicon oxidation layer is patternized afterwards at arbitrary points. In addition, control member 102 having a stopper is not confined to an arrangement shown in FIG. 40. It is preferable that control member 102 is formed leaving an air space with the plate shape member.

FIG. 40(i1) and FIG. 40(i2) are views of a production process to complete the light deflector. Etching removes the remaining first sacrificial layer 401 and the second sacrificial layer 402, by a wet etching method through an aperture part, and thereby the plate shape member 104 has the space in which to move. A light deflector is completed therefore. The etching is not limited to wet etching, and sacrificial layer etching can be carried out by dry etching depending on a kind of the sacrificial layer. In addition, as for the sacrificial layer etching, selecting the etching materials is important, as is optimizing materials of plate shape member 104, to make the etching proceed in a substrate planar orientation.

An experimental result of a divided fulcrum member of the present invention produced as described above is explained in the following. By an experiment, an Al series metal layer was used as plate shape member 104 of a light deflector. The size of plate shape member 104 was 13 micrometer*13 micrometer*depthwise 0.15 micrometer. When displacing to incline the plate shape member 104 with such a structure by ±10 degree, the time that plate shape member 104 was inclined by a driving voltage applied by electrodes 105a-105d, and was displaced (the following, response time), was compared for 5 μsec for a driving voltage with the present invention and a background embodiment.

With the background embodiment (FIG. 14), when the incline displacement occurred, a contact or frictional counter-force in a control member was caused, and displacement of the plate shape member 104 was disturbed. A driving voltage of 15V was needed to generate an electrostatic force to overcome the counter-force.

With the first embodiment (FIG. 15), because the fulcrum member is divided, the contact surface product with a plate shape member is reduced, the contact counter-force was reduced, and a driving voltage could be lowered. In fact, 12V was only needed to be provided. In addition, with the second to fifth embodiments (FIG. 16-FIG. 19), the contact surface of the plate shape member and the fulcrum member was reduced even more. A lower drive voltage could then even be possibly used, and in fact, driving was possible with only 10V.

In addition, with the background embodiment (FIG. 14), the lowest driving voltage (but response time is not considered) that incline displacement is possible by a stopper location and a contact fixing strength of a plate shape member was 10V. But with the sixth-tenth embodiments (FIG. 20-FIG. 24), because the contact surface product with a stopper location was reduced, the lowest driving voltage for which incline displacement was possible became only 5V.

Furthermore, when a light deflector of the eighth to tenth embodiments is compared with a light deflector of embodiment six or seven, because a divided stopper member only has a bridging portion in a stopper location, reliability of independence of a control member is improved and a production yield of a light deflector improves. In fact, a process yield of 88% was provided with the eighth to tenth embodiments. A process yield of 80% was provided with the sixth or seventh embodiments.

Next, a description shows a constitution and a production process of a light deflector using a fulcrum member described in the eleventh embodiment (FIG. 27) of the present invention. FIG. 41, FIG. 42, and FIG. 43 show a production manufacturing process of a light deflector of the eleventh embodiment. FIG. 41(a1), FIG. 41(b1), FIG. 41(c1), FIG. 42(d1), FIG. 42(e1), FIG. 42(f1), FIG. 43(g1), FIG. 43(h1), and FIG. 43(i1) are cross-sectional views of J-J'. FIG. 41(a2), FIG. 41(b2), FIG. 41(c2), FIG. 42(d2), FIG. 42(e2), FIG. 42(f2), FIG. 43(g2), FIG. 43(h2), and FIG. 43(i2) are top views.

In the production process of FIG. 41(a1) and FIG. 41(a2), the fulcrum member 103 is produced to a desired shape by forming a silicon oxidation layer composing fulcrum member 103 on top of substrate 101 by a plasma CVD method using a phototype process method with the use of a photomask having a cardinality gradation property or a phototype process method to make transform heat after the resist pattern formation. Then, the fulcrum member 103, which has a characteristic of being divided into segments in 1 axis direction of this embodiment, is formed afterwards by a dry etching method. The fulcrum member 103 could also be processed by making a silicon oxidation layer composing fulcrum member 103 on silicon substrate 101.

FIG. 41(b1) and FIG. 41(b2) are views of a production process of the electrodes 105a, 105b, 105c, and 105d. Electrodes 105a to 105d are formed of a film of a nitride titanium (TiN) membrane. A TiN film layer is made using Ti targeted DC magnetron sputtering method, which film is then patternized as electrodes 105a to 105d of a plural number by a phototype process method and dry etching. In addition, the electrodes need not only be made from TiN, but also from an aluminum system metal layer, for example.

FIG. 41(c1) and FIG. 41(c2) are views of a production process of the insulating layer 106 on electrodes 105a to 105d, in which a silicon oxidation layer by a plasma CVD method is formed on the electrodes 105a to 105d.

FIG. 42(d1) and FIG. 42(d2) are views of a production process of the first sacrificial layer 401. A silicon membrane, which is an amorphous substance, is formed by a sputtering method, and then a planarization is performed by processing time control by CMP technology. It is important that a film thickness of an amorphous substance silicon layer left on the top top of fulcrum member 103 then is controlled. An amorphous substance silicon membrane remaining is the first sacrificial layer 401. In addition, as the sacrificial layer, a polyimide membrane or photosensitivity organic layer (a resist layer used generally by a semiconductor process) or plural crystallization silicon layers can be used in addition to the above layer. And also, as a technique of a planarization, a re-flow method and background method by heat-treatment by dry etching can be used.

FIG. 42(e1) and FIG. 42(e2) are views of a production process of the plate shape member. The plate shape member 104 should have high light reflection. The plate shape member is made by forming an aluminum membrane by sputtering to form conductive material layer 104. A phototype process method and dry etching patternize it afterwards. In addition, the plate shape member need not always be one layer. The plate shape member may be two or three layers. The plate shape member may have a high reflection and a high coefficient of elasticity by being formed of two or three layers.

FIG. 42(f1) and FIG. 42(f2) are views of a production process of the second sacrificial layer 402. The second sacrificial layer 402 is made of a silicon layer which is an amorphous substance by a sputtering method. In addition, a polyimide membrane or photosensitivity organic layer (a resist layer used generally by a semiconductor process) or plural crystallization silicon layers can be used in addition to the above layer as the sacrificial layer.

FIG. 43(g1) and FIG. 43(g2) are views of a production process of the control member 102 having circumferentially a stopper with separate individual portions with a light deflector plate shape member 104. By a phototype process method and dry etching, the first sacrificial layer 401 and the second sacrificial layer 402 were compared with plate shape member 104 simultaneously, and is at least somewhat patternized. In this manufacturing process, divided aperture part 411 corresponding to the control member is formed.

FIG. 43(h1) and FIG. 43(h2) are views of a production process of arranging the stopper around the control member 102. A silicon oxidation layer composing control member 102 having a stopper is formed by a plasma CVD method. By a phototype process method and dry etching, a silicon oxidation layer is then patternized afterwards at arbitrary points. In addition, control member 102 having a stopper is not limited to the arrangement shown in FIG. 43. It is preferable that control member 102 is formed leaving an air space with the plate shape member.

FIG. 43(i1) and FIG. 43(i2) are views of a production process to complete the light deflector. An etching removes the remaining first sacrificial layer 401 and the second sacrificial layer 402 by a wet etching method through an aperture part, and thereby the space in which the plate shape member 104 can move is formed. A light deflector is completed therefore. The etching is not limited to a wet etching, and sacrificial layer etching can be carried out by dry etching depending on a kind of the sacrificial layer. In addition, as for the sacrificial layer etching, selecting the etching materials is important, as is optimizing materials of plate shape member 104, to make the etching proceed in a substrate planar orientation.

An experimental result of a divided fulcrum member of the present invention produced as described above is explained in the following. By an experiment, an Al series metal layer was used as plate shape member 104 of a light deflector. The size of plate shape member 104 was 13 micrometer*13 micrometer*depthwise 0.15 micrometer. When displacing to incline the plate shape member 104 with such a structure by ±10 degree, the time that plate shape member 104 was inclined by a driving voltage applied by electrodes 105-105d, and was displaced (the following, response time), was compared for 5 μsec for a driving voltage with the present invention and a background embodiment. The light deflector of the present invention and the light deflector of the background embodiment implemented light deflection in 2 dimensions of 1 axis.

With the background embodiment (FIG. 26), when slant displacement occurred, contact counter-force in a control member was caused, and displacement of plate shape member 104 was disturbed. A driving voltage of 24V was needed to generate an electrostatic force to overcome the counter-force.

With the eleventh embodiment (FIG. 27), because the fulcrum member is divided, the contact surface product with a plate shape member is reduced, the contact counter-force is reduced, and a lower driving voltage is needed. In fact, only 19V was needed to be provided. In addition, with the twelfth embodiment (FIG. 28), the contact surface of the plate shape member and the fulcrum member was reduced more. An even lower voltage drive then becomes possible, and in fact, driving was possible with only 16V. With the thirteenth embodiment (FIG. 29), driving was possible with 20V. With the fourteenth embodiment (FIG. 30), driving was possible with 15V. With the fifteenth embodiment (FIG. 31), driving was possible with 15V.

Next a description shows a constitution and a production process of a light deflector using a fulcrum member described in the sixteenth embodiment (FIG. 33) of the present invention. FIG. 44, FIG. 45, and FIG. 46 show a production manufacturing process of a light deflector of the sixteenth embodiment. FIG. 44(a1), FIG. 44(b1), FIG. 44(c1), FIG. 45(d1), FIG. 45(e1), FIG. 45(f1), FIG. 46(g1), FIG. 46(h1), and FIG. 46(i1) are cross-sectional views of K-K'. FIG. 44(a2), FIG. 44(b2), FIG. 44(c2), FIG. 45(d2), FIG. 45(e2), FIG. 45(f2), FIG. 46(g2), FIG. 46(h2), and FIG. 46(i2) are top views.

In the production process of FIG. 44(a1) and FIG. 44(a2), the fulcrum member 103 is produced to a desired shape by forming a silicon oxidation layer composing fulcrum member 103 on top of substrate 101 by a plasma CVD method using a phototype process method with the use of a photomask having a cardinality gradation property or a phototype process method to make transform heat after the resist pattern formation. Then, the fulcrum member 103 is formed afterwards by a dry etching method. The fulcrum member 103 could also be processed by making a silicon oxidation membrane composing fulcrum member 103 on silicon substrate 101.

FIG. 44(b1) and FIG. 44(b2) are views of a production process of the electrodes 105a, 105b, 105c, and 105d. Electrodes 105a to 105d are formed with a film of a nitride titanium (TiN) membrane, which film is made using Ti targeted DC magnetron sputtering method. The film is then patternized as electrodes 105a to 105d of a plural number by a phototype process method and dry etching. In addition, the electrode cannot only be made from TiN, but also from an aluminum system metal layer, for example.

FIG. 44(c1) and FIG. 44(c2) are views of a production process of the insulating layer 106 on electrodes 105a to 105d, in which a silicon oxidation layer by a plasma CVD method is formed on the electrodes 105a to 105d.

FIG. 45(d1) and FIG. 45(d2) are views of a production process of the first sacrificial layer 401. A silicon membrane, which is an amorphous substance, is formed by a sputtering method, and then a planarization is performed by processing time control by CMP technology. It is important that a film thickness of an amorphous substance silicon layer left on the top top of fulcrum member 103 then is controlled. An amorphous substance silicon layer remaining is the first sacrificial layer 401. In addition, as the sacrificial layer, a polyimide membrane or photosensitivity organic layer (a resist layer used generally by a semiconductor process) or plural crystallization silicon layers can be used in addition to the above layer. And also, as technique of a planarization, a re-flow method and background method by heat-treatment by dry etching can be used.

FIG. 45(e1) and FIG. 45(e2) are views of a production process of the plate shape member. The plate shape member 104 should have high light reflection. The plate shape member is made by forming an aluminum layer by sputtering to form conductive material layer 104. A phototype process method and dry etching patternize it afterwards. In addition, the plate shape member need not always be one layer. The plate shape member may be two or three layers. The plate shape member may have a high reflection and a high coefficient of elasticity by being formed by two or three layers.

FIG. 45(f1) and FIG. 45(f2) are views of a production process of the second sacrificial layer 402. The second sacrificial layer 402 is made of a silicon layer which is an amorphous substance by a sputtering method. In addition, a polyimide membrane or photosensitivity organic layer (a resist layer used generally by a semiconductor process) or plural crystallization silicon layers can be used in addition to the above layer as the sacrificial layer.

FIG. 46(g1) and FIG. 46(g2) are views of a production process of the control member 102 having circumferentially a stopper with separate individual portions with a light deflector plate shape member 104. By a phototype process method and dry etching, the first sacrificial layer 401 and the second sacrificial layer 402 were compared with plate shape member 104 simultaneously, and is at least somewhat patternized. In this manufacturing process, divided aperture part 411 corresponding to a fulcrum member of the control member is formed.

FIG. 46(h1) and FIG. 46(h2) are views of a production process of arranging the stopper around the control member 102. A silicon oxidation layer composing control member 102 having a stopper is formed by a plasma CVD method. By a phototype process method and dry etching, a silicon oxidation layer was patternized afterwards at arbitrary points. In addition, control member 102 having a stopper is not confined to an arrangement shown in FIG. 46. It is preferable that control member 102 is formed leaving an air space with a plate shape member.

FIG. 46(i1) and FIG. 46(i2) are views of a production process to complete the light deflector. An etching removes the remaining first sacrificial layer 401 and the second sacrificial layer 402 by a wet etching method through an aperture part, and thereby the space in which the plate shape member 104 can move is formed. A light deflector is completed therefore. The etching is not limited to wet etching, and sacrificial layer etching can be carried out by dry etching depending on a kind of the sacrifice layer. In addition, as for the sacrificial layer etching, selecting the etching materials is important, as is optimizing materials of plate shape member 104, to make the etching proceed in a substrate planar orientation.

An experimental result of a divided fulcrum member of the present invention produced as described above is explained in the following. By an experiment, an Al series metal layer was used as plate shape member 104 of a light deflector. The size of plate shape member 104 was 13 micrometer*13 micrometer*depthwise 0.15 micrometer. When displacing to incline plate shape member 104 with such a structure by ±10 degree, the present invention was compared with a background embodiment with respect to the lowest driving voltage for which incline displacement was possible (but the time that a plate shape member needs in incline displacement, namely response time, is not considered).

In the background embodiment (FIG. 13), a plate shape member comes in contact with a substrate in one side of full length of a plate shape member. Therefore, a fixing strength by contact arises over a full length, and a counter-force as opposed to an electrostatic force arises. As a result, the smallest driving voltage becomes 10V. In other words, a fixing strength is superior in comparison with an electrostatic force by less than 10V, and incline displacement does not start.

On the other hand, in the sixteenth embodiment (FIG. 33), the contact surface area with a plate shape member and a substrate was reduced, and the lowest driving voltage for which incline displacement was possible became 5V. In addition, the length that a contact area of a convexity shape in the sixteenth embodiment comes in contact with a plate shape member is 1.5 micrometer per one place. A similar result was provided for the eighteenth embodiment (FIG. 37).

In addition, with the seventeenth embodiment (FIG. 36), because an effect of a contact area of a convexity shape and an insulation layer of silicon oxidation layers is not composed by a contact area, utilizing a low drive voltage of 3V becomes possible; the driving voltage is so low as a contact fixing strength with a plate shape member was further reduced.

FIG. 47 shows light deflection array related to nineteenth and twentieth embodiments of the present invention. A light deflection array of the present invention arranges more than one previously described light deflector in 1 dimension or 2 dimensions.

Figure 47A:
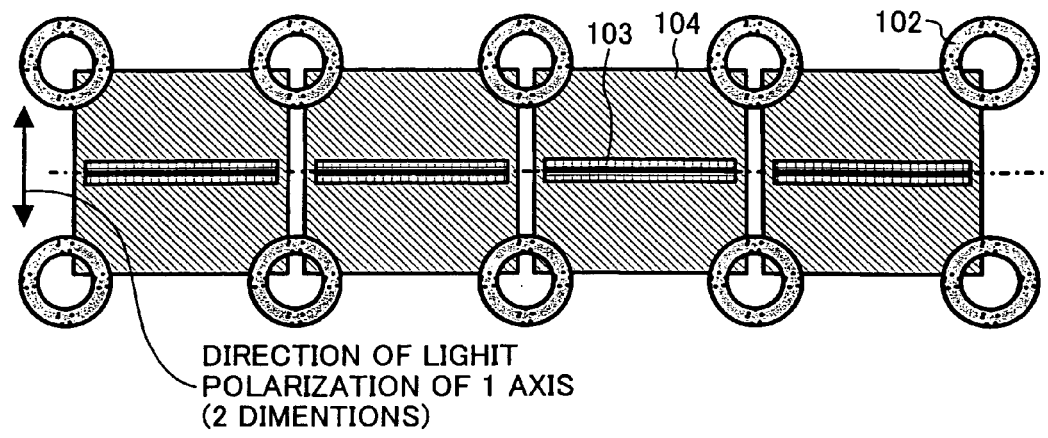
FIGS. 47A and 47B show a light deflection alley of the nineteenth and twentieth embodiment of the present invention.

FIG. 47A shows a top view of a 2 dimensions of 1 axis light deflection array. This light deflection array arranges a light deflector with the use of control member 102 of FIG. 23 in one line of multiple pieces vertical to a light deflection direction. This is a 1 dimension array of the nineteenth embodiment (1 dimension array arrangement).

Figure 47B:
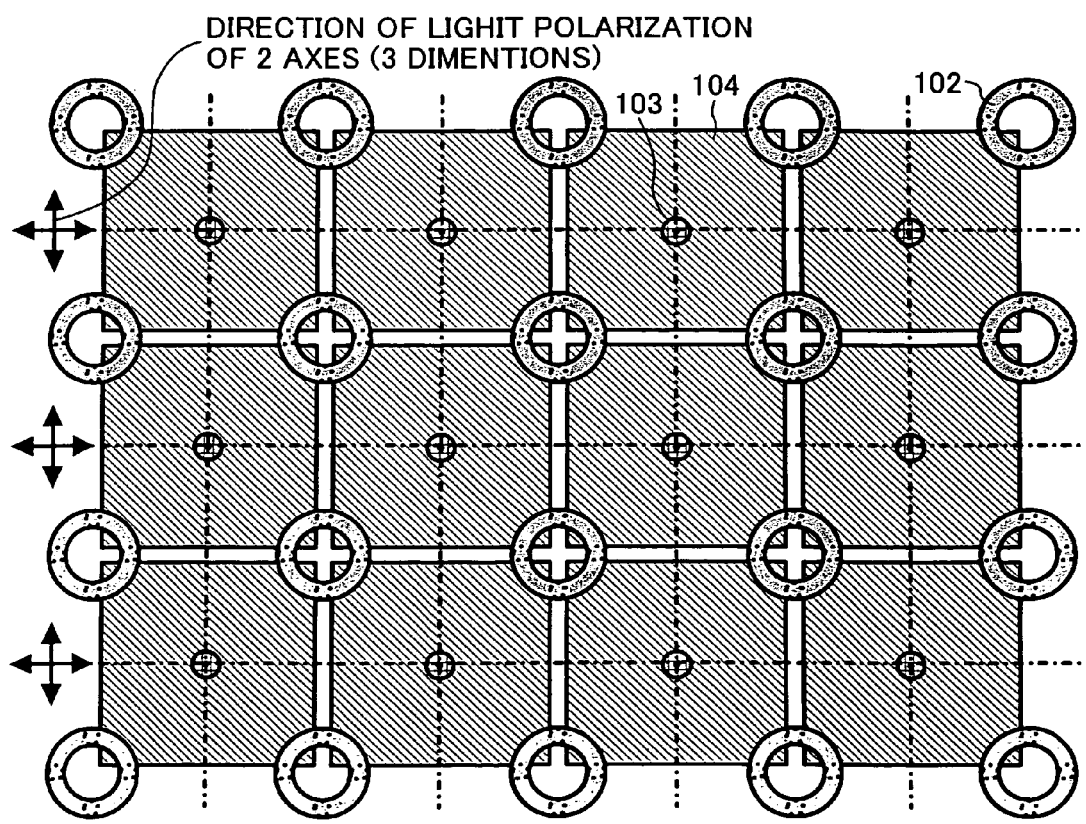

FIG. 47B shows a top view of a 3 dimensions of 2 axis light deflection array. This light deflection array arranges a light deflector with the use of control member 102 of FIG. 23 and fulcrum member 103 of FIG. 30 in one line of multiple pieces in two axial light deflection directions. This is a 2 dimension array of the twentieth embodiment (2 dimension array arrangement).

FIG. 48 shows a light deflection array related to twenty-first and twenty-second embodiments of the present invention. A light deflection array of the present invention arranges more than one previously described light deflector in 1 dimension or 2 dimensions.

Figure 48A:
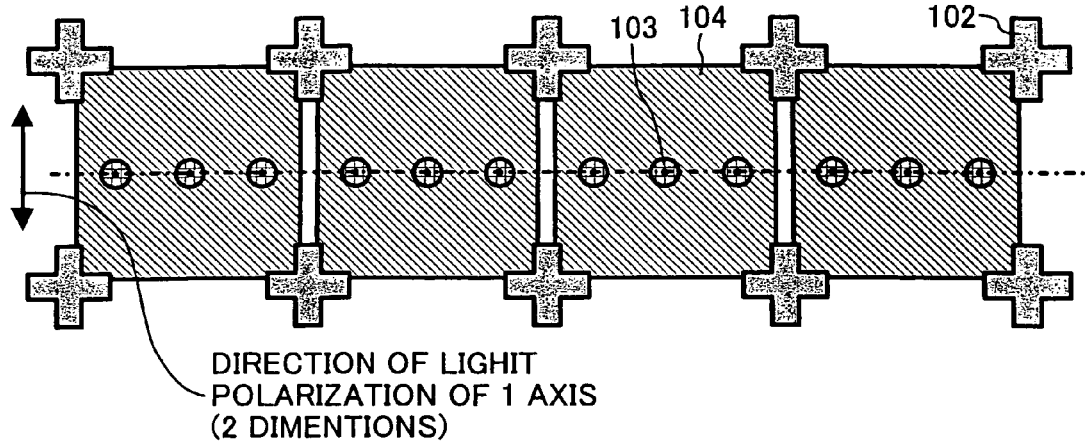
FIGS. 48A and 48B show a light deflection alley of the twenty-first and twenty-second embodiment of the present invention.

FIG. 48A shows a top view of a 2 dimensions of 1 axis light deflection array. This light deflection array arranges a light deflector with the use of fulcrum member 103 of FIG. 30 in one line of multiple pieces vertical to a light deflection direction. This is a 1 dimension array of the twenty-first embodiment (1 dimension array arrangement).

Figure 48B:
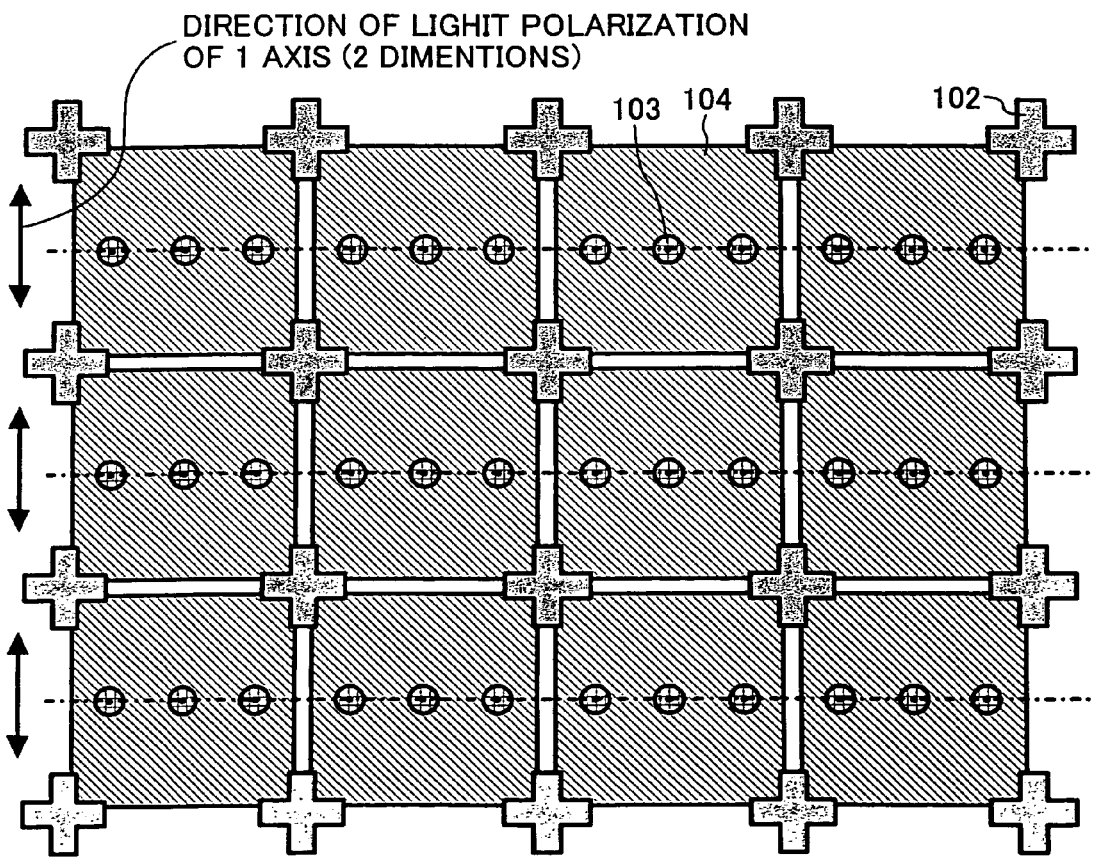

FIG. 48B shows a top view of a 3 dimensions of 2 axis light deflection array. This light deflection array arranges a light deflector with the use of fulcrum member 103 of FIG. 30 in one line of multiple pieces in two axial light deflection direction. This is a 2 dimension array of the twenty-second embodiment (2 dimension array arrangement).

FIG. 49 shows light deflection array related to twenty-third and twenty-fourth embodiments of the present invention. A light deflection array of the present invention arranges more than one previously described light deflector in 1 dimension or 2 dimensions.

Figure 49A:
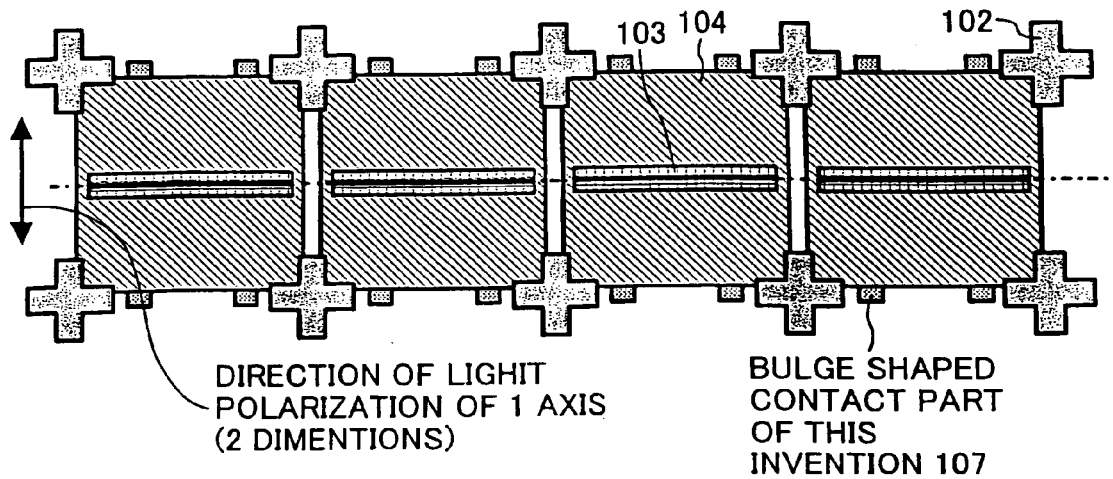
FIGS. 49A and 49B show a light deflection alley of the twenty-third and twenty-fourth embodiment of the present invention.

FIG. 49A shows a top view of a 2 dimensions of 1 axis light deflection array. This light deflection array arranges a light deflector with the use of convex contact member 107 of FIG. 33 in one line of multiple pieces vertical to a light deflection direction. This is a 1 dimension array of the twenty-third embodiment (1 dimension array arrangement).

Figure 49B:
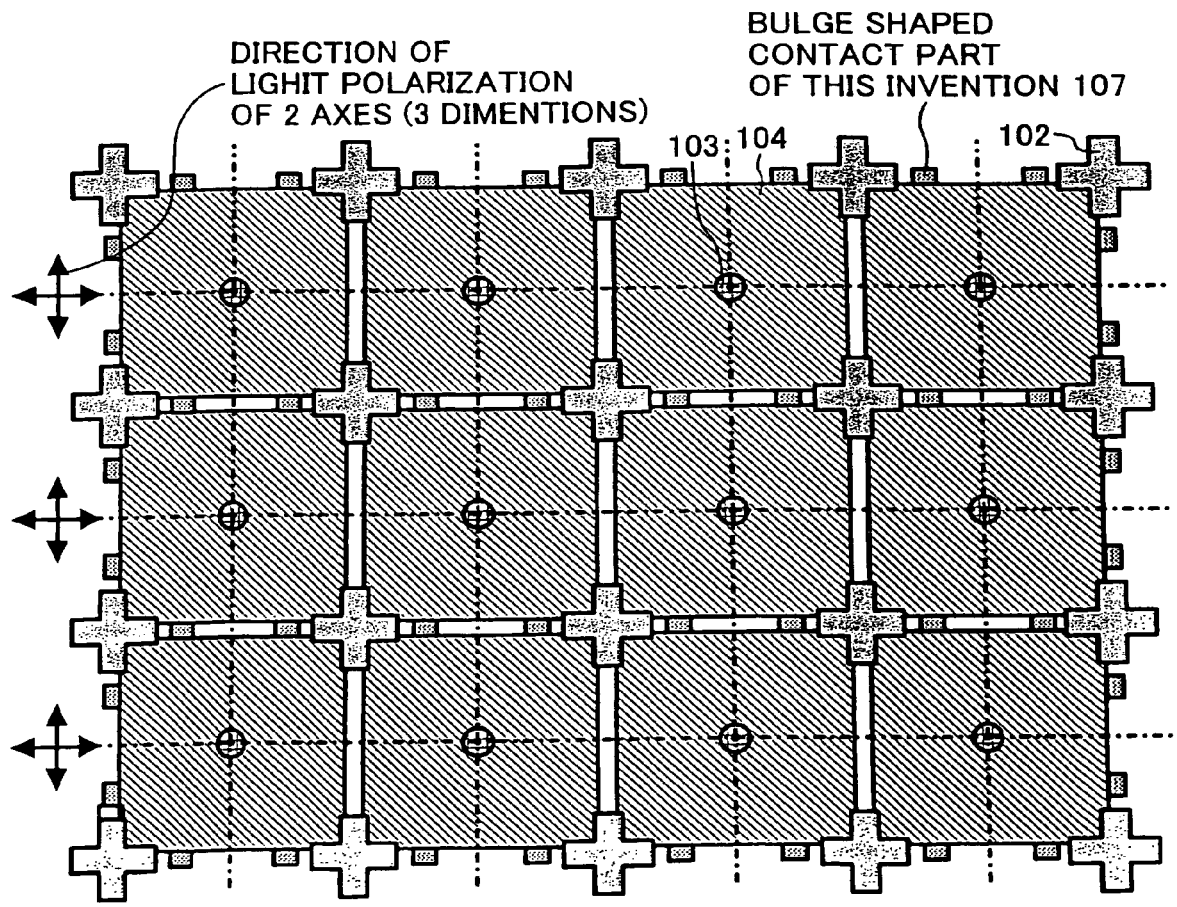

FIG. 49B shows a top view of a 3 dimensions of 2 axis light deflection array. This light deflection array arranges a light deflector with the use of convex contact member 107 of FIG. 33 and fulcrum member 103 of FIG. 30 in one line of multiple pieces in two axial light deflection directions. This is a 2 dimension array of the twenty-fourth embodiment (2 dimension array arrangement).

As described above, more than one light deflector of the present invention can be arranged in 1 dimension or 2 dimensions, and with such arrays, the light deflector of the present invention can provide a light deflection array with a low drive voltage.

Figure 50:
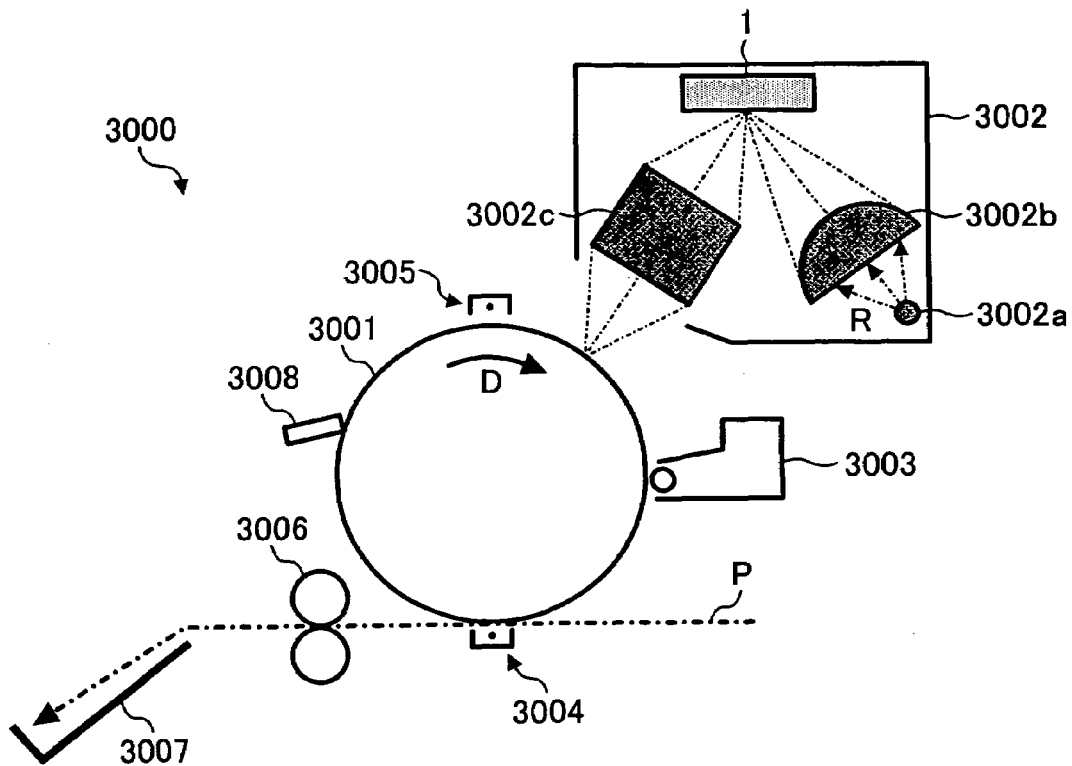
FIG. 50 shows an image forming apparatus of the twenty-fifth embodiment of the present invention.

FIG. 50 shows an image forming apparatus related to a twenty-fifth embodiment. In FIG. 50, an image forming apparatus of the twenty-fifth embodiment using light deflection array 1 shown in FIG. 47, FIG. 48, and FIG. 49 as a light writing unit 3002 that is a latent image forming apparatus.

An image forming apparatus 3000 forms an image by light-writing based on an electronic picture process. The image forming apparatus 3000 includes a drum-shaped photosensitive body of an image carrier 3001. The image carrier is rotatably held in a direction indicated by an arrow D and carries formed images. The photosensitive body of the image carrier is electrically charged evenly by an electric charge device 3005. Light-writing is performed on the photosensitive body by the light writing unit 3002 formed by the light deflection array 1 so that a latent image is formed. The latent image is formed on the photosensitive body as a toner image by a developing device 3003. And then, the toner image is transferred to a transferred body (P) by a transferring device 3004. After the toner image transferred to the transferred body (P) is fixed by a fixing device 3006, the transferred body (P) is discharged to a discharging tray 3007 to be stored. On the other hand, the photosensitive body of the image carrier 3001, after the toner image is transferred to the transferred body (P) by the transferring device 3004, is cleaned by cleaning device 3008 so as to be prepared for a next image forming process.

The light writing unit 3002 irradiates a beam (R) from a light source 3002a incident onto the light deflection array 1 via a first lens system 3002b. Each of the light deflectors is tilted and displaced corresponding to image information so as to change the direction of reflection light and light deflection array 1 image-forms the irradiated beam (R) on a surface of the photosensitive body of the image carrier 3001 via a second lens system 3002c.

By using a light deflection array of the present invention as a light unit of an image forming apparatus, a low drive voltage can be provided to a light writing unit.

Figure 51:
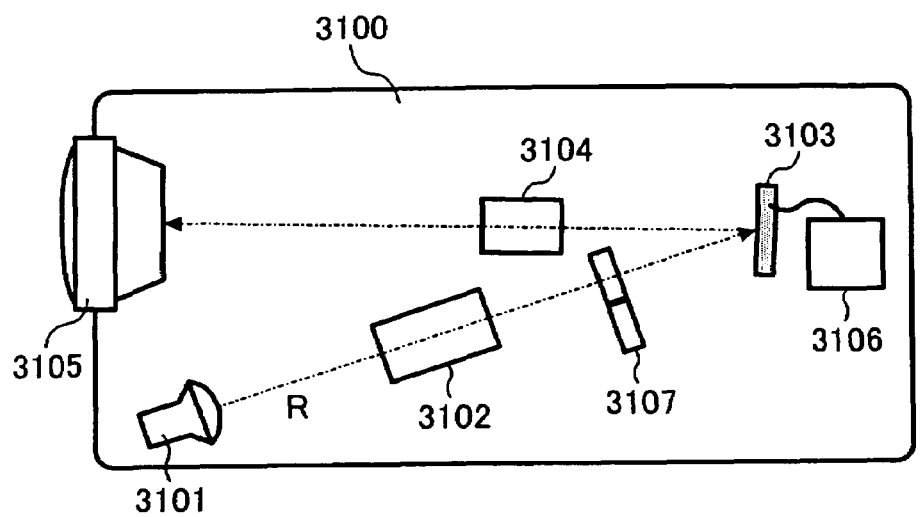
FIG. 51 shows an image display apparatus of the twenty-sixth embodiment of the present invention.

FIG. 51 is a view showing an image projection display apparatus of a twenty-sixth embodiment of the present invention. An image projection display apparatus 3100 of the twenty-sixth embodiment uses the light deflection array of FIG. 47, FIG. 48 and FIG. 49 as a display unit 3103 by which a beam (R) from a light source 3101 is reflected in the direction of an object, corresponding to image information.

Referring to FIG. 51, the light source 3101 is a simpler and more inexpensive light source than a laser light source, for example light source 3001 is a white color light source. A lighting optical system 3102 leads the beam from the light source 3101 to a light deflection array 3103 of the present invention. Projection optical systems 3104 and 3105 expand and project a beam deflected in the direction of an object by the light deflection array arranged two-dimensionally corresponding to a pixel line in the vertical direction of a display picture and a pixel line in the horizontal direction of the display picture. A control system 3106 formed by electronic circuits controls operation of the light deflection array 3103. In FIG. 51, a part of the light beam (R) is indicated by a dotted line. Light emitted from the light source 3101 is led to the light deflection array 3103 by lighting optical system 3102. The light beam deflected by the light deflection array 3103 is projected as a two-dimensional image by the projection optical systems 3104 and 3105. A rotating color wheel 3107 is used for selecting the wave length of the incident beam which is led to the light deflection array 3103. An image projection display apparatus of the twenty-sixth embodiment, because light deflection array of the present invention is used as an indication unit, a low drive voltage can be provided in the indication unit.

Obviously, numerous modifications and variations of the present invention are possible in light of the above teachings. It is therefore to be understood that within the scope of the appended claims, the present invention may be practiced otherwise than as specifically described herein.

The invention claimed is:

1. A light deflector comprising:

a substrate;

a plurality of control members, wherein stoppers are provided at upper parts of the control members and the control members are provided at a plurality of end parts of the substrate;

a support for each control member;

a fulcrum member including a vertex part and provided at an upper surface of the substrate;

a plate shape member supported by the fulcrum member, and having a light reflection area, the plate shape member not having a fixed end, the plate shape member including a conductive material layer having conductivity, the plate shape member being movably arranged in a space formed between the substrate, the fulcrum member, and the stoppers, a plurality of electrodes provided on the substrate to face the conductive material layer of the plate shape member, wherein the plate shape member is inclined around the fulcrum member by an electrostatic force from the plurality of electrodes, wherein each support is divided into portions so that contact between the support and respective plate shape member is reduced as the plate shape member moves in inclination, and wherein the support has a quadrangle form.

2. The light deflector as claimed in claim 1, wherein the support and the side of the plate shape member contact at only approximately a point.

3. A light deflector comprising:

a substrate;

a plurality of control members, wherein stoppers are provided at upper parts of the control members and the control members are provided at a plurality of end parts of the substrate;

a support for each control member;

a fulcrum member including a vertex part and provided at an upper surface of the substrate;

a plate shape member supported by the fulcrum member, and having a light reflection area, the plate shape member not having a fixed end, the plate shape member including a conductive material layer having conductivity, the plate shape member being movably arranged in a space formed between the substrate, the fulcrum member, and the stoppers, a plurality of electrodes provided on the substrate to face the conductive material layer of the plate shape member, wherein the plate shape member is inclined around the fulcrum member by an electrostatic force from the plurality of electrodes, wherein each support is divided into portions so that contact between the support and respective plate shape member is reduced as the plate shape member moves in inclination, and wherein each stopper is divided supporting the divided support.

4. A light deflection array, comprising:

a plurality of light deflectors which are provided one-dimensionally or two-dimensionally, and which each comprise:

a substrate, a plurality of control members, wherein stoppers are provided at upper parts of the control members and the control members are provided at a plurality of end parts of the substrate, a support for each control member, a fulcrum member including a vertex part and provided at an upper surface of the substrate, a plate shape member supported by the fulcrum member, and having a light reflection area, the plate shape member not having a fixed end, the plate shape member including a conductive material layer having conductivity, the plate shape member being movably arranged in a space formed between the substrate, the fulcrum member, and the stoppers, a plurality of electrodes provided on the substrate to face the conductive material layer of the plate shape member, wherein the plate shape member is inclined around the fulcrum member by an electrostatic force from the plurality of electrodes, and wherein each support is divided into portions so that contact between the support and respective plate shape member is reduced as the plate shape member moves in inclination, wherein the support has a quadrangle form.

5. An image forming device, comprising:

a light deflection array used as a light writing unit, wherein the light deflection array includes a plurality of light deflectors provided one-dimensionally or two-dimensionally, and which each comprise:

a substrate, a plurality of control members, wherein stoppers are provided at upper parts of the control members and the control members are provided at a plurality of end parts of the substrate, a support for each control member, a fulcrum member including a vertex part and provided at an upper surface of the substrate, a plate shape member, supported by the fulcrum member, and having a light reflection area, the plate shape member not having a fixed end, the plate shape member including a conductive material layer having conductivity, the plate shape member being movably arranged in a space formed between the substrate, the fulcrum member, and the stoppers, a plurality of electrodes provided on the substrate to face the conductive material layer of the plate shape member, wherein the plate shape member is inclined around the fulcrum member by an electrostatic force from the plurality of electrodes, wherein each support is divided into portions so that contact between the support and respective plate shape member is reduced as the plate shape member moves in inclination, and wherein the support has a quadrangle form.

6. An image projection display device, comprising:

a light deflection array used as a display unit, wherein the light deflection array includes a plurality of light deflectors provided one-dimensionally or two-dimensionally, and each comprises:

a substrate, a plurality of control members, wherein stoppers are provided at upper parts of the control members and the control members are provided at a plurality of end parts of the substrate, a support for each control member, a fulcrum member including a vertex part and provided at an upper surface of the substrate, a plate shape member, supported by the fulcrum member, and having a light reflection area, the plate shape member not having a fixed end, the plate shape member including a conductive material layer having conductivity, the plate shape member being movably arranged in a space formed between the substrate, the fulcrum member, and the stoppers, a plurality of electrodes provided on the substrate to face the conductive material layer of the plate shape member, wherein the plate shape member is inclined around the fulcrum member by an electrostatic force from the plurality of electrodes, wherein each support is divided into portions so that contact between the support and respective plate shape member is reduced as the plate shape member moves in inclination, and wherein the support has a quadrangle form.

* * * * *